(12) United States Patent
Drewnowski et al.

(10) Patent No.: US 10,793,461 B2
(45) Date of Patent: Oct. 6, 2020

(54) METHOD AND SYSTEM FOR MAKING 3D GLASS, GLASS-CERAMIC AND CERAMIC OBJECTS

(71) Applicant: CORNING INCORPORATED, Corning, NY (US)

(72) Inventors: Christopher William Drewnowski, Corning, NY (US); Michael Fischer, Corning, NY (US); Michael Thomas Gallagher, Painted Post, NY (US); Xinghua Li, Horseheads, NY (US); Nicholas Ryan Wheeler, Corning, NY (US); Thomas Michael Zajicek, Big Flats, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 16/461,655

(22) PCT Filed: Nov. 17, 2017

(86) PCT No.: PCT/US2017/062154
§ 371 (c)(1),
(2) Date: May 16, 2019

(87) PCT Pub. No.: WO2018/094142
PCT Pub. Date: May 24, 2018

(65) Prior Publication Data
US 2019/0352210 A1    Nov. 21, 2019

Related U.S. Application Data

(60) Provisional application No. 62/423,997, filed on Nov. 18, 2016.

(51) Int. Cl.
*C03B 19/01* (2006.01)
*B33Y 10/00* (2015.01)
*B33Y 30/00* (2015.01)

(52) U.S. Cl.
CPC .............. *C03B 19/01* (2013.01); *B33Y 10/00* (2014.12); *B33Y 30/00* (2014.12)

(58) Field of Classification Search
CPC ..................................................... C03B 19/01
(Continued)

(56) References Cited

U.S. PATENT DOCUMENTS

| 5,121,329 A | 6/1992 | Crump |
| 5,578,227 A | 11/1996 | Rabinovich |

(Continued)

FOREIGN PATENT DOCUMENTS

| CN | 102403466 A | 4/2012 |
| CN | 102690046 A | 9/2012 |

(Continued)

OTHER PUBLICATIONS

Luo et al; "Additive Manufacturing of Glass for Optical Application"; Proc. 9738, Laser 3D Manufacturing III, 97380Y (2016) pp. 97380Y-1-97380Y-9 (Year: 2016).*

(Continued)

*Primary Examiner* — Brent T O'Hern
(74) *Attorney, Agent, or Firm* — Gregory V. Bean

(57) ABSTRACT

A apparatus for making a three-dimensional object (glass, glass ceramic or ceramic) that includes: a gripping fixture 102a having a grip surface or a pedestal 102 having a build surface 130, the grip or build surface configured to hold an end of a contiguous, preformed material 106, such as a fiber or a ribbon; a feed system 100 having a feed outlet 118 positioned above the grip or build surface, the feed system configured to feed the contiguous, preformed material into a (Continued)

build zone between the feed outlet and the grip or build surface; and a laser delivery system 134 arranged to direct at least one laser beam through the furnace 132 and into the build zone to form a hot spot 126 in the build zone; and a positioning system 120 arranged to effect relative motion between the grip or build surface and the feed outlet. In some implementations, the apparatus for making a 3D object can also include a furnace 132 enclosing the build zone and the feed outlet.

40 Claims, 12 Drawing Sheets

(58) Field of Classification Search
USPC .......................................................... 428/81
See application file for complete search history.

(56) References Cited

U.S. PATENT DOCUMENTS

| 6,143,378 | A | 11/2000 | Harwell et al. |
| 6,722,872 | B1 | 4/2004 | Swanson et al. |
| 8,460,755 | B2 | 6/2013 | Rodgers |
| 8,591,087 | B2 | 11/2013 | Bickham et al. |
| 2015/0307385 | A1 | 10/2015 | Klein et al. |
| 2015/0343704 | A1 | 12/2015 | Stahl et al. |
| 2017/0355633 | A1 | 12/2017 | Cook et al. |
| 2018/0221949 | A1 | 8/2018 | Rowland et al. |
| 2018/0237329 | A1 | 8/2018 | Drewnowski et al. |

FOREIGN PATENT DOCUMENTS

| JP | 2007261850 A | 10/2007 |
| WO | 2018002001 A1 | 1/2018 |

OTHER PUBLICATIONS

International Search Report and Written Opinion of the International Searching Authority; PCT/US2017/062154; dated Feb. 1, 2018; 16 Pages; European Patent Office.

Luo et al; "Additive Manufacturing of Glass for Optical Application"; Proc. 9738, Laser 3D Manufacturing III, 97380Y (2016) pp. 97380Y-1-97380Y-9.

* cited by examiner

METHOD AND SYSTEM FOR MAKING 3D GLASS, GLASS-CERAMIC AND CERAMIC OBJECTS

CROSS-REFERENCE TO RELATED APPLICATIONS

This application claims the benefit of priority under 35 U.S.C. § 371 of International Application No. PCT/US2017/062154, filed on Nov. 17, 2017, which claims the benefit of priority under 35 U.S.C. § 119 of U.S. Provisional Application Ser. No. 62/423,997 filed on Nov. 18, 2016, the content of which is relied upon and incorporated herein by reference in its entirety.

FIELD OF THE DISCLOSURE

The present disclosure relates generally to methods and systems for making three-dimensional ("3D") glass, glass-ceramic and ceramic objects and, more particularly, methods and systems for making such objects from contiguous, glass, glass-ceramic and ceramic precursors using manual and computer-controlled, laser-assisted fabrication techniques.

BACKGROUND

Flat and plate forms of glass and glass-ceramics can be formed into three-dimensional parts with processes such as molding (e.g., vacuum-assisted molding, blow-molding, etc.) and pressing. However, forming complex glass and glass-ceramic parts with internal features, such as internal cavities, channels and the like, with these methods is near-impossible. While some post-processing techniques can be employed to form holes, e.g., by drilling or etching, the capabilities of these techniques are limited in terms of forming various desired internal features, including channels. Further, even if post-processing is feasible to form a desired internal feature, such techniques can add significant cost to the part, while increasing the risk of defect-formation.

Particulate, powder, agglomerate-related glass, glass-ceramic and ceramics can also be formed with molding, pressing and sintering-type processes to form three-dimensional objects. While many of these processes can be employed to form various part forms, including those with asymmetrical surfaces, dimensional control is often difficult as these processes also typically rely on binders and other processing aids that oxidize during processing. For these same reasons, dimensional control over any desired internal features is also dimensional. In addition, the mechanical properties and/or environmental resistance-related (e.g., corrosion resistance) properties of parts formed from these processes may suffer as various grains, interfaces and defects often remain in these parts after processing.

Additive manufacturing ("AM"), also referred to as "3D Printing," processes are being developed to fabricate three-dimensional parts, typically parts comprising polymeric materials. Many of these parts are built directly from a computer-aided ("CAD") model of the part, employing a layer-by-layer build approach with laser-cured materials. Further, most conventional AM and 3D Printing-type processes employ powder and/or liquid precursors for the development of parts comprising polymeric materials. Accordingly, the resulting parts, typically fabricated from polymeric materials, often have grains and interfaces associated with the precursors employed in their fabrication. Also, as these polymeric materials have low susceptibility to thermal shock and thermal stress-related issues, temperature management during processing is often of little concern.

Accordingly, there is a need for 3D fabrication techniques for materials, such as glass, glass-ceramics and ceramic materials, which can be resistant to thermal shock- and thermal stress-related defects and failures. There is also a need for fabrication techniques for these materials that can be employed to make parts with highly complex exterior and/or interior surfaces, as defined through CAD and other computer-assisted patterns. There is an additional need for fabrication techniques that can make such parts that approach their theoretical strength and other mechanical properties, with limited processing-related mechanical and/or environmental resistance-related property reductions.

SUMMARY

A first aspect of the disclosure pertains to an apparatus for making a three-dimensional object that includes: a pedestal having a build surface; a feed system having a feed outlet positioned above the build surface, the feed system configured to feed a contiguous, preformed material into a build zone between the feed outlet and the build surface; a furnace enclosing the build surface, build zone and the feed outlet; a laser delivery system arranged to direct at least one laser beam through the furnace and into the build zone to form a hot spot in the build zone; and a positioning system arranged to effect relative motion between the build surface and the feed outlet. In some implementations, the apparatus for making a 3D object can also include a cooling element positioned outside of the furnace, the cooling element configured to cool the contiguous, preformed material above the feed outlet.

A second aspect of the disclosure pertains to an apparatus for making a three-dimensional object that includes: a gripping fixture having a grip surface, the grip surface configured to hold an end of a contiguous, preformed material; a feed system having a feed outlet positioned above the grip surface, the feed system configured to feed the contiguous, preformed material into a build zone between the feed outlet and the grip surface; and a laser delivery system arranged to direct at least one laser beam through the furnace and into the build zone to form a hot spot in the build zone; and a positioning system arranged to effect relative motion between the grip surface and the feed outlet. In some implementations, the apparatus for making a 3D object can also include a furnace enclosing the build zone and the feed outlet; and a cooling element positioned outside of the furnace, the cooling element configured to cool the contiguous, preformed material above the feed outlet.

In certain implementations of the foregoing apparatus for making a 3D object, the positioning system is arranged to effect the relative motion in three orthogonal directions, and wherein the pedestal or gripping fixture is coupled to the positioning system. The positioning system can also be arranged to effect the relative motion in at least one of a rotational direction and a tilt direction.

According to other implementations of these apparatus for making a 3D object, the feed system can be further configured to feed the contiguous, preformed material at a variable speed into the build zone. In some embodiments, the contiguous, preformed material can comprise at least one of a glass, a glass-ceramic and a ceramic. The contiguous, preformed material can also be in the form of a rod, a fiber or a tube, according to some embodiments.

In an additional implementation of the foregoing apparatus for making a 3D object, the apparatus further includes a controller coupled to the feed system, the laser delivery system and the positioning system. Further, the controller is configured to control the relative motion between the build surface or the grip surface and the feed outlet based at least in part on controller communication with the feed system, the laser delivery system and the positioning system.

A third aspect of the disclosure pertains to a method of making a three-dimensional object that includes: developing a hot spot in a build zone located between a feed outlet and a build surface; feeding a contiguous, preformed material through the feed outlet into the build zone and using the hot spot to selectively heat an attachment end of the contiguous, preformed material to a viscous state; attaching the attachment end in a viscous state to the build surface; feeding the contiguous, preformed material through the feed outlet into the build zone and using the hot spot to selectively heat a build portion of the contiguous, preformed material above the attachment end to a viscous state; and forming the object in the build zone by effecting relative motion of the build portion and the feed outlet according to an object creation pattern. Further, the object creation pattern is based at least in part on a description of a three-dimensional object.

A fourth aspect of the disclosure pertains to a method of making a three-dimensional object that includes: developing a hot spot in a build zone located between a feed outlet and a grip surface; attaching an attachment end of a contiguous, preformed material to the grip surface; feeding the contiguous, preformed material through the feed outlet into the build zone and using the hot spot to selectively heat a build portion of the contiguous, preformed material to a viscous state; and forming the object in the build zone by effecting relative motion of the build portion and the feed outlet according to an object creation pattern. Further, the object creation pattern is based at least in part on a description of a three-dimensional object.

In certain implementations of the foregoing methods of making a 3D object, the step of developing the hot spot comprises directing at least one laser beam into the build zone. The developing step can also include directing at least two laser beams into the build zone, the at least two laser beams being arranged to approach the build zone from different directions.

According to other implementations of the foregoing methods of making a 3D object, the forming step can be conducted by effecting relative motion of the build portion and the feed outlet in three orthogonal directions according to the object creation pattern. The forming step can additionally include effecting relative motion of the build portion and the feed outlet in at least one of a rotational direction and a tilt direction according to the object creation pattern. With further regard to the fourth aspect, the forming can also be conducted such that the effecting relative motion comprises positioning the grip surface above the build zone according to the object creation pattern.

In some embodiments of the foregoing methods, the contiguous, preformed material can comprise at least one of a glass, a glass-ceramic and a ceramic. The contiguous, preformed material can also be in the form of a rod, a fiber or a tube, according to some embodiments.

A fifth aspect of the disclosure pertains to a glass article that comprises: a three-dimensional object comprising a contiguous material, the material comprising a glass; and an over-hang feature comprising the contiguous material, the feature defined by at least one member emanating from the object. In some embodiments, the at least one member emanating from the object forms an angle of at least 90 degrees from the object. The contiguous material can be a glass comprising silica. Further, the glass article can be formed from any of the foregoing apparatus and methods for making a 3D object.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the disclosure as it is claimed.

The accompanying drawings are included to provide a further understanding of principles of the disclosure, and are incorporated in, and constitute a part of, this specification. The drawings illustrate one or more embodiment(s) and, together with the description, serve to explain, by way of example, principles and operation of the disclosure. It is to be understood that various features of the disclosure disclosed in this specification and in the drawings can be used in any and all combinations. By way of non-limiting examples, the various features of the disclosure may be combined with one another according to the following aspects.

BRIEF DESCRIPTION OF THE DRAWINGS

These and other features, aspects and advantages of the present disclosure are better understood when the following detailed description of the disclosure is read with reference to the accompanying drawings, in which.

DETAILED DESCRIPTION

Figure 1:
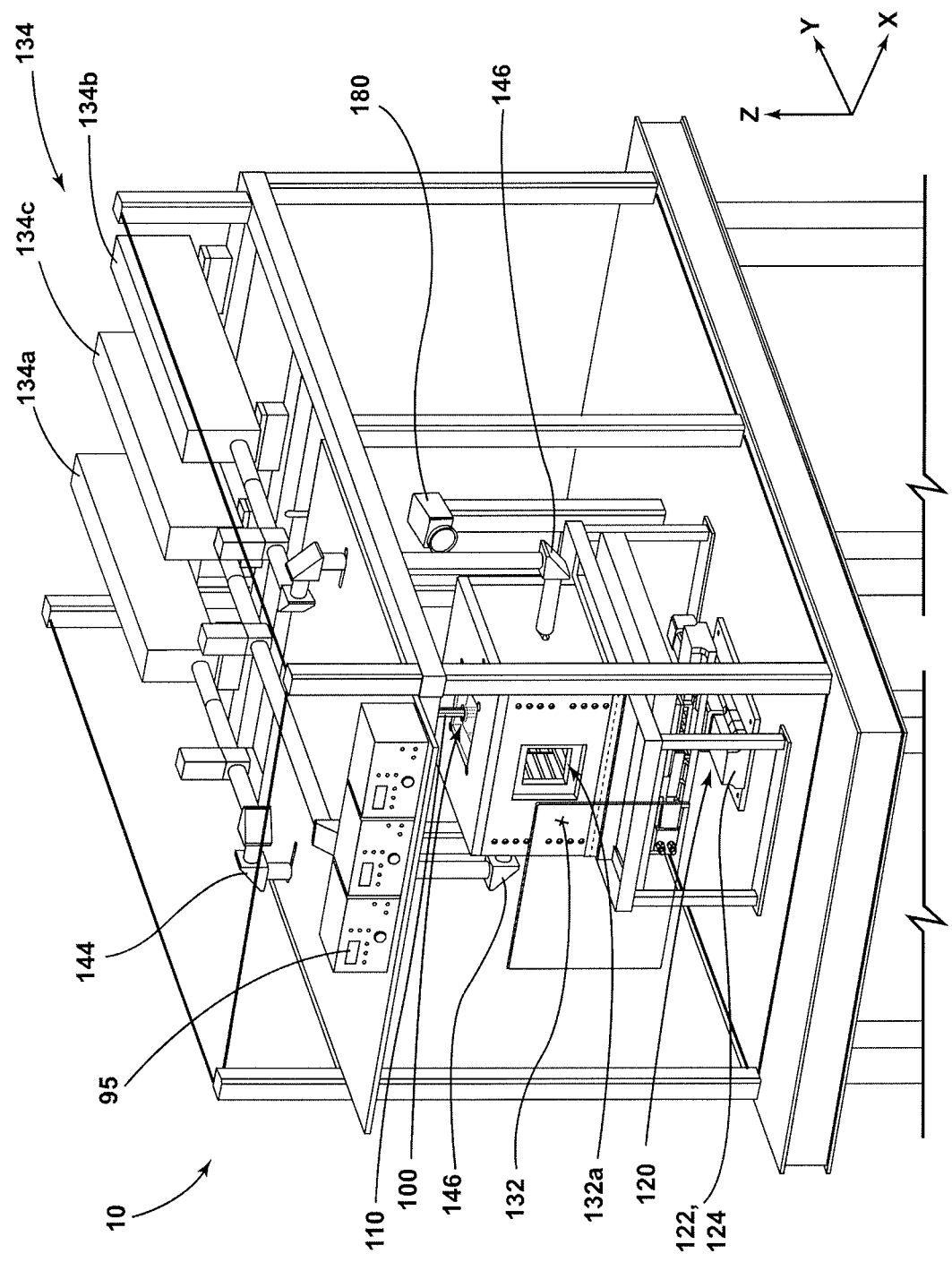
FIG. 1 is a schematic, perspective view of an apparatus comprising a pedestal having a build surface for making a three-dimensional object comprising a glass, glass-ceramic or ceramic material according to an embodiment.
Figure 1A:
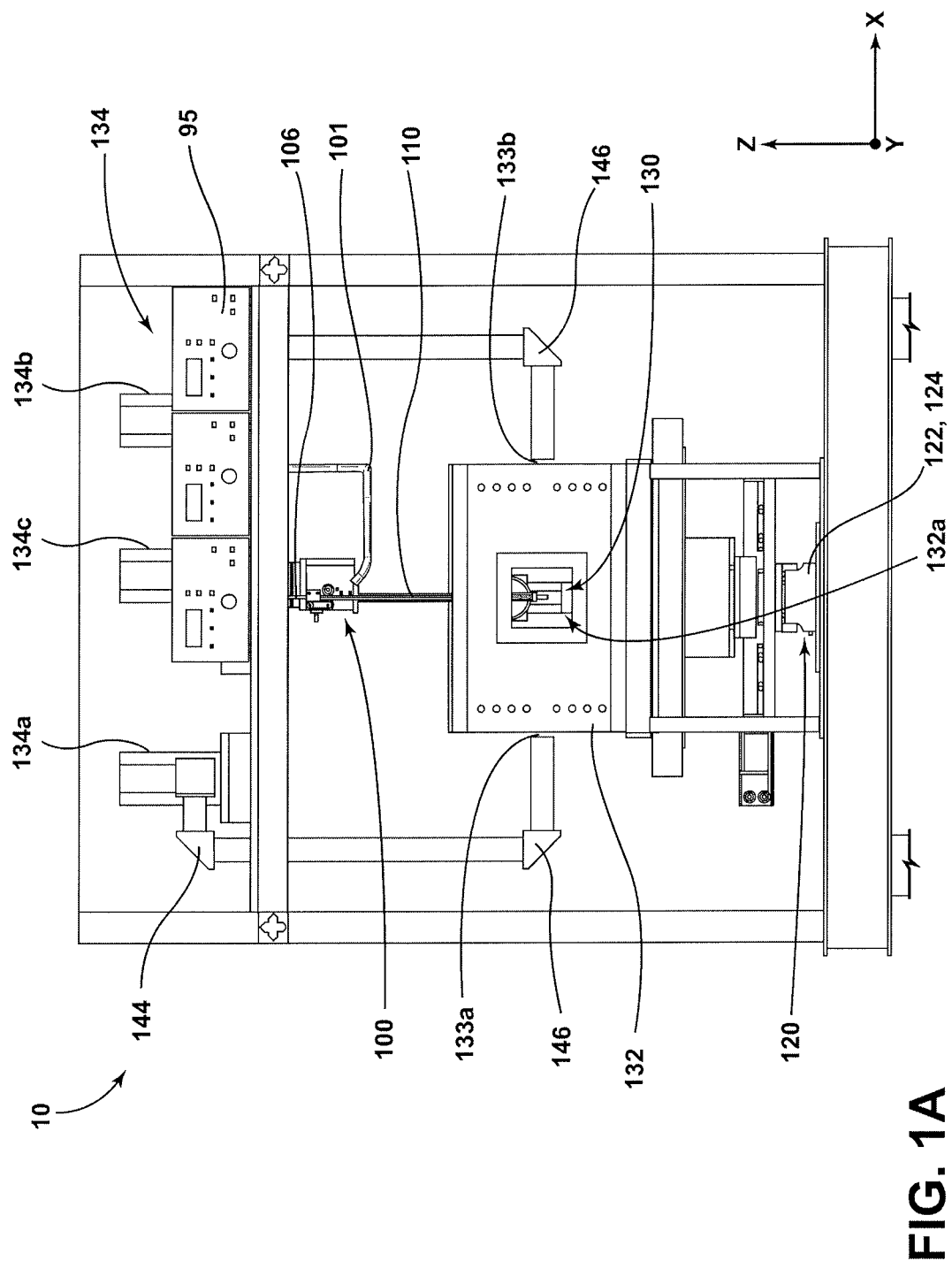
FIG. 1A is a schematic, side view of the apparatus depicted in FIG. 1.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

Aspects of the disclosure generally relate to methods and systems for making three-dimensional ("3D") glass, glass-ceramic and ceramic objects and articles. Aspects of these methods and systems can be employed to make such objects and articles from contiguous, glass, glass-ceramic and ceramic precursors using manual and computer-controlled, laser-assisted fabrication techniques.

There are many advantages associated with these apparatus and methods for making 3D objects and articles comprising glass, glass-ceramic and ceramic materials. One advantage is that the objects and articles made with these apparatus and methods can be less susceptible to thermal stress-related defects and failures during and after processing, e.g., through the better temperature and microstructure control of these apparatus and methods compared to other conventional forming methods and apparatus for these same materials. Another advantage is that the fabrication techniques and apparatus of the disclosure can be employed to make parts with highly complex exterior and/or interior surfaces, as defined through CAD and other computer-assisted patterns. Another advantage is that these techniques and systems can be employed to make glass, glass-ceramic and ceramic objects and articles that approach their theoretical strength and other mechanical properties, with limited processing-related mechanical and/or environmental resistance-related property reductions associated with internal interfaces, inclusions, gas bubbles and other defects. A further advantage of these apparatus and methods is that they can be employed to precisely control the viscosity of glass and glass-ceramic materials during object and article formation, thus facilitating significant control over final object shapes, surfaces and features. An additional advantage of these apparatus and methods is that they can be employed to develop articles relatively quickly (e.g., as compared to layer-by-layer printing approaches) by 'drawing' them in one continuous or nearly-continuous motion in free space with no or limited retracing.

Figure 1B:
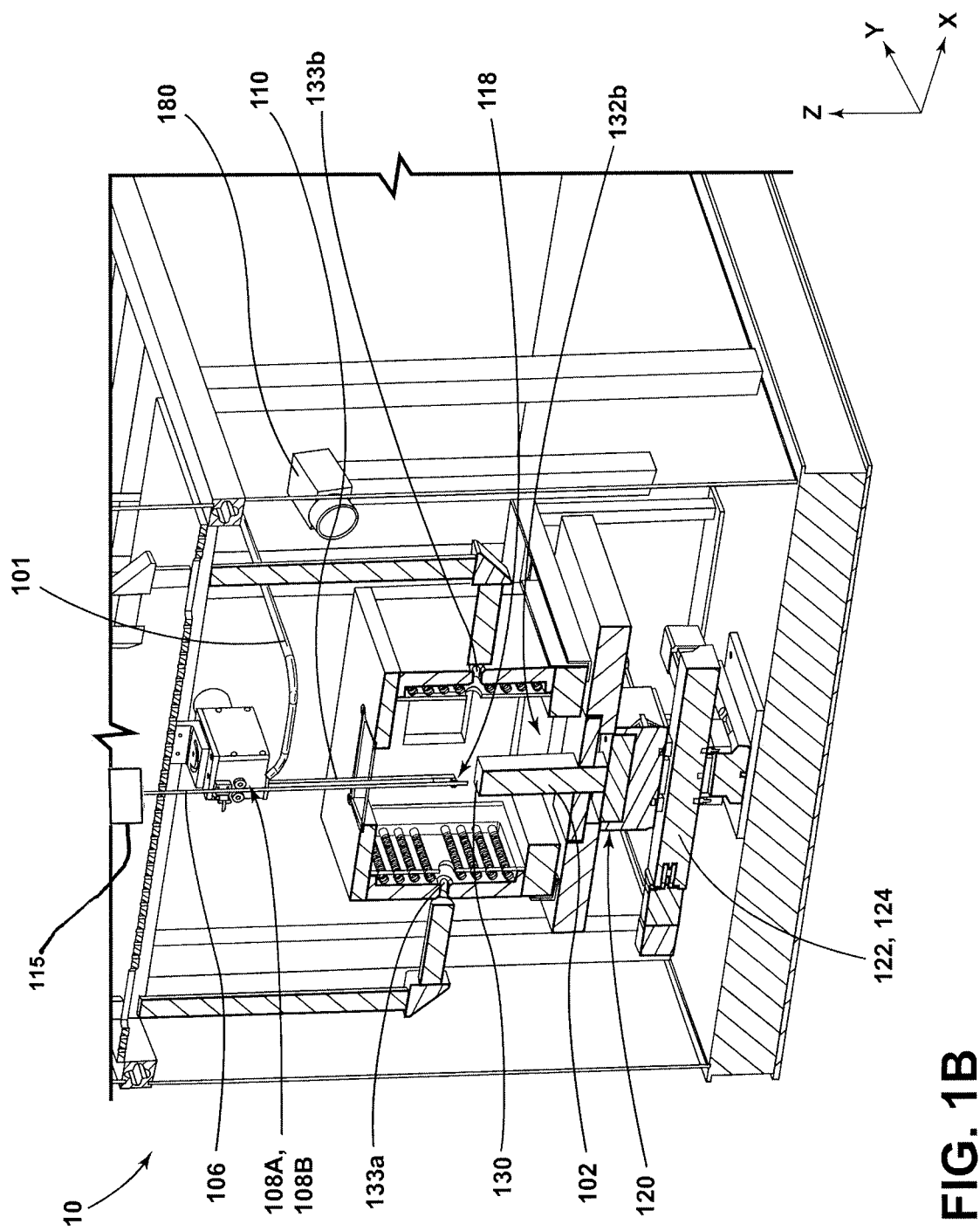
FIG. 1B is a schematic, cross-sectional perspective view of the apparatus depicted in FIG. 1.
Figure 1C:
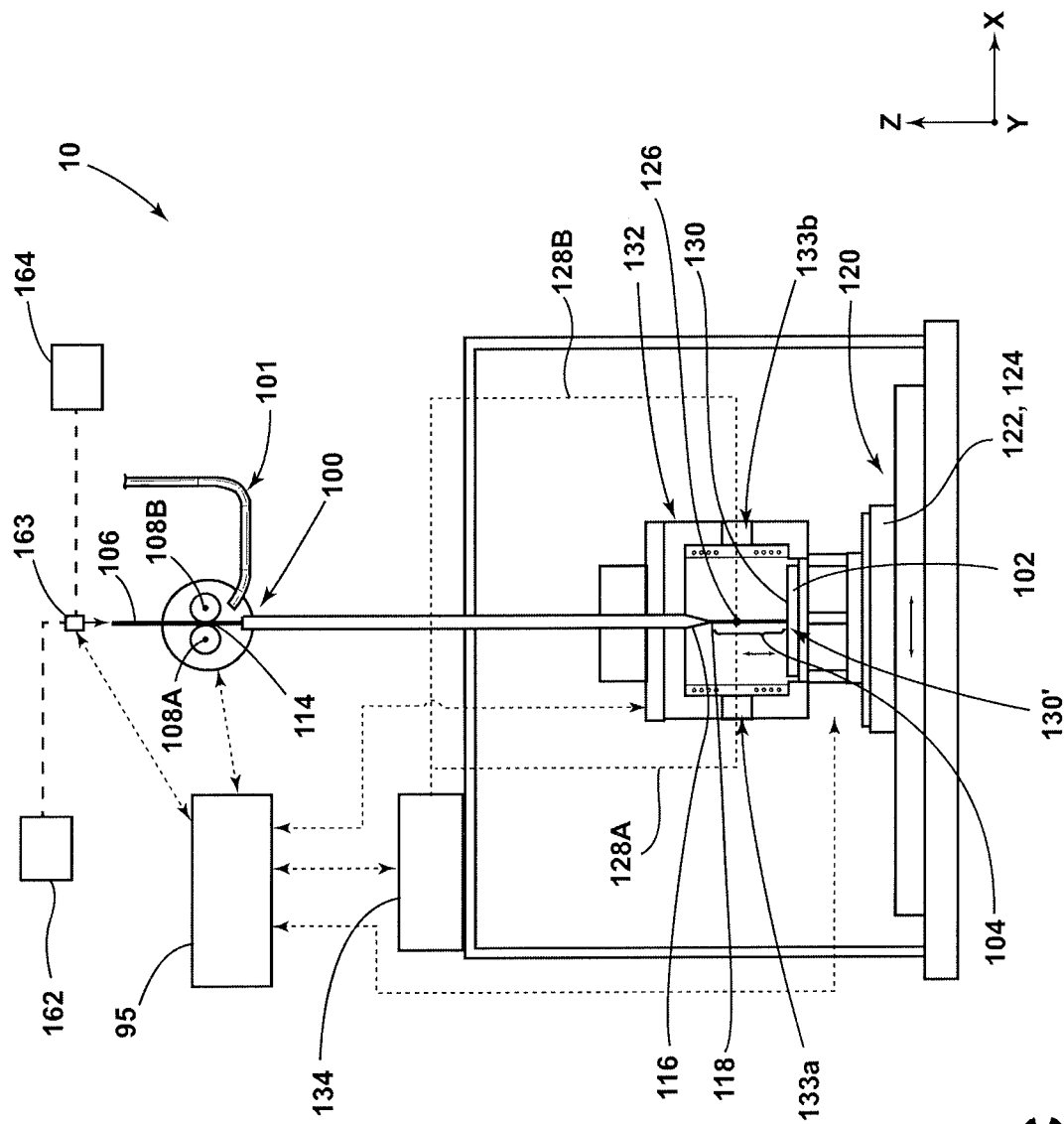
FIG. 1C is a schematic view of the apparatus depicted in FIG. 1.

Referring to FIGS. 1-1C, an embodiment of a system 10 for making a 3D object is depicted. The system 10 for making a 3D object includes a pedestal 102 having a build surface 130; and a feed system 100 with a feed outlet 118 positioned above the build surface 130. Further, the feed system 100 is configured to feed a contiguous, preformed material 106 into a build zone 104 between the feed outlet 118 and the build surface 130. The system 10 for making a 3D object also includes a furnace 132 that encloses the build surface 130, the build zone 104 and the feed outlet 118. The system 10 for making a 3D object further includes a laser delivery system 134 that is arranged to direct at least one laser beam, e.g., laser beams 128A and 128B, through the furnace 132 and into the build zone 104 to form a hot spot 126 in the build zone 104. The system 10 for making a 3D object also includes a positioning system 120 that is arranged to effect relative motion between the build surface 130 and the feed outlet 118, e.g., through control of the motion of the pedestal 102 and its build surface 130 and/or the speed of delivery of the preformed material 106 from the feed system 100.

As used herein, the term "contiguous, preformed material" relates to glass, glass-ceramic, and ceramic materials, and combinations of the these material that (a) have been formed or shaped beforehand; and (b) currently reside in a contiguous form that is substantially without the presence of internal interfaces, defects, inclusions, bubbles and the like that are typically associated with other forms of these materials, such as sintered powder and particulate. The contiguous, preformed material 106 can, in some embodiments, comprise at least one of a glass, a glass-ceramic and a ceramic material. Further, in some embodiments, the contiguous, preformed material 106 may comprise a glass or a glass-ceramic that is strengthened via ion-exchange or is ion-exchangeable (i.e., able to be strengthened via ion-exchange, for example, after deposition onto the build surface 130). For example, the contiguous, preformed material 106 can include a soda-lime glass, an aluminosilicate glass, an alkali-aluminosilicate glass, a borosilicate glass, an alkali-borosilicate glass, an aluminoborosilicate glass, an alkali-aluminoborosilicate glass, or a fused silica glass. For example, a contiguous, preformed material 106 comprising a glass material may employ a glass selected from Corning® Eagle XG® glass, Gorilla® glass, and/or Pyrex® glass. As another example, a contiguous, preformed material 106 comprising a fused silica glass can include glass from Corning Incorporated (e.g., HPFS® 7980, HPFS® 7979, etc.), Asahi Glass Co. (e.g., AQ Series, AQT Series, AQR Series, etc.), Nippon Electric Glass Co., etc. In another embodiment, the contiguous, preformed material is a glass comprising silica. The preformed material 106 can also consist essentially of silica in some embodiments. In some embodiments, the preformed material 106 may comprise a light diffusing material, for example, the light diffusing fiber and the preform materials used to form the light diffusing fiber described in U.S. Pat. No. 8,591,087, titled "Optical Fiber Illumination Systems and Methods," herein incorporated herein by reference in its entirety.

In some implementations, the preformed material 106 can be in the form of a rod, a fiber or a tube. The preformed material 106 can also take the form of a thin sheet, plate or a ribbon. When configured in a rod or rod-like form, the preformed material 106 can have a round cross-section or a non-round cross-section, such as square or rectangular cross-section. A rod of preformed material 106 may be solid, or have a hollow core. When configured in a fiber or fiber-like form, the preformed material 106 may have a transparent core or a hollow core. The core of the fiber, whether transparent or hollow, may have any desired cross-sectional shape, such as circular or elliptical. The fiber may have any desired cross-sectional shape, such as round, square, or flat. The diameter of the fiber or rod may be in a range from 100 µm to 7 mm. In some embodiments, a rod of preformed material 106 will have a larger diameter and will be shorter than a fiber. The thickness of the thin sheet and ribbon may be in a range from 10 µm to 7 mm. The length of the preformed material 106 can be variable.

Further, in some embodiments, the build surface 130 may comprise a glass, glass-ceramic or ceramic material, for example, any of the materials of the preformed material 106 described above. In some embodiments, the build surface 130 and the preformed material 106 may comprise the same material or may comprise materials with similar properties, for example, similar or matching coefficient of thermal expansion (CTE).

According to some implementations, the contiguous, preformed material(s) 106 used in building the 3D objects with the system 10 depicted in FIGS. 1-1C can be a transparent glass or glass-ceramic, which would enable building of 3D glass or glass-ceramic objects that are transparent. The transparency of the preformed material(s) 106 will be preserved in the as-formed 3D object because the methods and apparatus of the disclosure advantageously avoids the use of binders and powders while building the 3D object. That is, the transparency of the 3D object will be nominally the same as the transparency of the preformed material(s) 106 used in building the 3D object. In one embodiment, a 3D object made from the system 10 may be considered as transparent if it has a transmittance of at least 80% in a range of wavelengths from 390 nm to 750 nm as measured by a spectrophotometer. In another embodiment, a 3D object made from the system 10 may be considered as transparent if visibility through the 3D object is without optical distortion. In yet another embodiment, a 3D object may be considered as transparent if there are no visible interfaces along one or more axis of the 3D object. In another embodiment, 3D objects built with the system 10 may be colorless.

The feed system 100, as shown in FIGS. 1-1C, may generally include a pair of feed wheels 108A, 108B for advancing a contiguous, preformed material 106 in a direction towards the build zone 104. The feed system 100 may further include a guide tube 110 for guiding the contiguous, preformed material 106 into the build zone 104. In one embodiment, the guide tube 110 has an internal longitudinal passage (not visible in the drawing) that is aligned to receive the preformed material 106 from the feed wheels 108A, 108B. The guide tube 110 may have a guide tip 116 with a feed opening 118 that is sized and shaped just to accommodate the cross-section of the preformed material 106, which may enable precise delivery of the preformed material 106 into the build zone 104. The feed opening 118, or wherever the preformed material 106 emerges from the feed system 100 into the build zone 104, may be referred to as the feed outlet 118 of the feed system 100. Further, according to some aspects, the feed system 100 can include a cooling tube 101, or a similar feature, that can be employed to cool the portion of the contiguous, preformed material 106 that passes through and out of the feed wheels 108A, 108B, above the feed outlet 118. The cooling tube 101 can ensure that the contiguous, preformed material 106 is not heated by the hot spot 126 and/or the furnace 132 to a temperature that exceeds the temperature capability (e.g., Tg temperature) of the feed system 100, including the feed wheels 108A, 108B.

Referring still to FIGS. 1-1C, in some embodiments, the feed system 100 further comprises a feed source 115 (shown in FIG. 1B) configured to house or otherwise contain the continuous, preformed material 106. For example, the feed source 115 may comprise a spool and the contiguous, preformed material 106 may be wound around the spool. In operation, the feed wheels 108A, 108B may pull a desired length of the preformed material 106 from the feed source 115, such as the spool, as needed. In some cases, the preformed material 106 may be in the form of a ribbon conveyed to the feed system 100. In some embodiments, the spacing 114 between the feed wheels 108A, 108B, i.e., where the preformed material 106 passes in between the feed wheels 108A, 108B, may be adjustable so that the feed wheels 108A, 108B can feed different preformed material diameters or thicknesses to the guide tube 110. Also, the guide tube 110, guide tip 116 and/or feed outlet 118 may be interchangeable with other guide tubes, guide tips and outlets to allow delivery of the different preformed material diameters or thicknesses into the build zone 104.

Referring again to the system 10 for making a 3D object depicted in FIGS. 1-1C, the feed system 100 can be employed to feed a contiguous, preformed material 106 into the build zone 104 at a feed rate appropriate to attach an end of it through the hot spot 126 to the attachment portion 130' of the build surface 130 of the pedestal 102. Further, the feed system 100 can be employed to feed a contiguous, preformed material 106 into the build zone 104 at a feed rate appropriate to create a build portion from the preformed material 106 in the hot spot 126, as the build surface 130 is moved relative to the feed outlet 118 by the positioning system 120 during the formation of the 3D object by the system 10 on the pedestal 102. In some embodiments, the feed rate of the contiguous, preformed material 106 into the build zone 104 from the feed system 100 may be selected based on the type of preformed material 106; manual operation; and/or an object creation pattern (as described in the methods for making a 3D object outlined later in the disclosure). The feed rate employed by the feed system 100 may also be correlated to the desired viscosity of the preformed material 106 at the hot spot 126. In some embodiments, the feed rate, which may be related to the rotational speed of the feed wheels 108A, 108B, may be in a range from about 1 mm/s to about 5 mm/s. In some cases, more than one preformed material 106 may be needed to attach a portion of it to the attachment portion 130' of the build surface 130 and/or complete the build portion of the 3D object. In such cases, the desired preformed materials may be fed into the build zone 104 at a predetermined sequence as specified manually or, for example, by a computer-driven, object creation pattern (as described in more detail below). Where multiple preformed materials are used, there is liberty in selecting the material type, cross-sectional shape, and dimensions of the preformed materials 106, thereby enabling great complexity in forming and developing the 3D objects formed by the system 10.

Further, in some embodiments, multiple preformed materials may be simultaneously feed from the feed system 100 onto the build surface 130. The multiple preformed materials may comprise the same material or different materials. For example, the multiple preformed materials may comprise two glasses, for example, two glasses having the same or similar CTEs and viscosities. Using the same or similar materials as the multiple preformed materials allows the materials to be locally heated by the same laser beam. Alternatively, the multiple preformed materials may comprise materials with differing properties, such as different CTEs and viscosity, for example, a glass material and a metal material (such as copper) or two glass materials with differing properties. In this embodiment, the multiple preformed materials could be locally heated by laser beams having different wavelengths. For example, a first preformed material may be locally heated by a laser beam having a first wavelength and a second preformed material may be locally heated by a laser beam having a second wavelength. Further, the first preformed material may be transparent to the second wavelength (such that it is not effected by the second laser beam) and the second preformed material may be transparent to the first wavelength (such that it is not effected by the first laser beam).

According to an embodiment, the pedestal 102 is mounted on a positioning system 120 (see FIG. 1B). In one embodiment, the positioning system 120 is capable of translating the pedestal 102 along three orthogonal directions, i.e., along X, Y, and Z axes. As an example, the positioning system 120 may include a Z stage 122 to allow translation of the pedestal 102 along the Z axis and an XY stage 124 to allow translation of the pedestal 102 in the XZ plane. The positioning system 120 will allow relative motion between the pedestal 102 and the feed outlet 118 in at least three orthogonal directions. In some implementations, the positioning system 120 can also include an additional stage or stages (not shown) to effect rotational motion and/or tilt movement of the pedestal 102 relative to the feed outlet 118. Such rotational motion and/or tilt movement capability can also be incorporated into the Z stage 122 and/or XY stage 124. Instead of mounting the pedestal 102 on a positioning system 120, or in addition to mounting the pedestal 102 on the positioning system 120, the feed system 100 may be mounted to a separate positioning system (not shown) such that the position of the feed outlet 118 relative to the pedestal 102 can be adjusted. However, it may be more convenient to move the pedestal 102 relative to the feed outlet 118.

In general, any method of effecting relative motion between the pedestal 102 and the feed outlet 118 in any of three orthogonal directions may be used. Relative motion between the feed outlet 118 and the pedestal 102 will allow the contiguous, preformed material 106 to be deposited on the pedestal 102 in a desired pattern. Further, the feed rate employed by the feed system 100 may be variable, for example, to compensate for change of direction of the relative motion between the pedestal 102 and the feed outlet 118. For example, when the relative motion between the pedestal 102 and the feed outlet 118 is slowed, for example, to change direction, the feed rate may be also be slowed to facilitate uniform deposition of the contiguous, preformed material 106. Further, the relationship between the speed of relative motion between the pedestal 102 and the feed outlet 118 and the feed rate may control the thickness of the portion of the contiguous, preformed material 106 deposited onto the build surface 130. When the speed of relative motion between the pedestal 102 and the feed outlet 118 is greater than the feed rate, the thickness of the portion of the contiguous, preformed material 106 deposited onto the build surface 130 will be less than the thickness of the portion the thickness of the portion of the contiguous, preformed material 106 traveling between the feed source 115 and the build surface 130. Further, when the speed of relative motion between the pedestal 102 and the feed outlet 118 is less than the feed rate, the thickness of the portion of the contiguous, preformed material 106 deposited onto the build surface 130 will be greater than the thickness of the portion the thickness of the portion of the contiguous, preformed material 106 traveling between the feed source 115 and the build surface 130.

In some embodiments, the feed source 115 is rotatable about a feed axis of the contiguous, preformed material 106. As used herein, the "feed axis" refers to a line formed by the contiguous, preformed material 106 as the contiguous, preformed material 106 travels from the feed source 115 to the build surface 130. In embodiments in which the feed source 115 is directly above the build surface 130 and the contiguous, preformed material 106 travels from the feed source 115 to the build surface 130 without any change of direction (such as the embodiments depicted in FIGS. 1-1C), the feed axis is the Z axis. In operation, rotation of the feed source 115 may rotate the portion of the contiguous, preformed material 106 traveling between the feed source 115 and the build surface 130.

In operation, rotation of the contiguous, preformed material 106 by the feed source 115 may prevent the portion of the contiguous, preformed material 106 deposited onto the build surface 130 from twisting. For example, when the contiguous, preformed material 106 is not rotating and the direction of relative motion between the build surface 130 and the contiguous, preformed material 106 along the XY plane is changed, the portion of the contiguous, preformed material 106 being deposited onto the build surface 130 may twist. However, rotation of the contiguous, preformed material 106 by the feed source 115 may compensate for this twist. Further, rotation of the contiguous, preformed material 106 by the feed source 115 may alternatively induce twisting the portion of the contiguous, preformed material 106 deposited onto the build surface 130. For example, when the contiguous, preformed material 106 is not rotating and the direction of relative motion between the build surface 130 and the contiguous, preformed material 106 along the XY plane is changed, the portion of the contiguous, preformed material 106 being deposited onto the build surface 130 may twist and rotation of the contiguous, preformed material 106 by the feed source 115 is a rotation direction that is opposite from the rotational direction that compensates for this twist may instead induce additional twisting. For example, additional twisting via rotation of the feed source 115 may be used to separate the portion of the contiguous, preformed material 106 being deposited onto the build surface 130 from the rest of the contiguous, preformed material 106 by forming multiple twists in the contiguous, preformed material 106, adding stress to the contiguous, preformed material 106. Furthermore, in embodiments in which multiple preformed materials are simultaneously feed from the feed system 100 onto the build surface 130, rotation of the feed source 115, rotation of the build surface 130, or both, may weave or otherwise intertwine these multiple preformed materials together.

As one example, a 90° change in the direction of relative motion between the build surface 130 and the contiguous, preformed material 106 along the XY plane will cause a 90° twist in the portion of the contiguous, preformed material 106 being deposited onto the build surface 130. Rotation of the rotation of the contiguous, preformed material 106 by the feed source 115 by 90° in one rotational direction may prevent this twist. Moreover, rotation of the rotation of the contiguous, preformed material 106 by the feed source 115 by 90° in the opposite rotational direction may double this twist (i.e. may cause a 180° twist). As another example, circular relative motion between the build surface 130 and the contiguous, preformed material 106 along the XY plane (i.e. to form a spiral of deposited material 106) may cause a 360° twist in the portion of the contiguous, preformed material 106 being deposited onto the build surface 130. Rotation of the rotation of the contiguous, preformed material 106 by the feed source 115 by 360° in one rotational direction may prevent this twist. Moreover, rotation of the rotation of the contiguous, preformed material 106 by the feed source 115 by 360° in the opposite rotational direction may double this twist (i.e. may cause a 720° twist).

In one embodiment of the system 10 for making a 3D object depicted in FIGS. 1-1C, a hot spot 126 is created or otherwise developed in the build zone 104, between the feed outlet 118 and the pedestal 102. In one embodiment, the hot spot 126 is aligned with the feed outlet 118 such that the contiguous, preformed material 106 passes from the feed outlet 118 through the hot spot 126 prior to reaching the pedestal 102 and attaching to an attachment portion 130' of the build surface 130 in a viscous state. In another embodiment, the hot spot 126 is aligned with the feed outlet 118 such that a build portion of the contiguous, preformed material 106, previously attached to the build surface 130 of the pedestal 102, is heated to a viscous state and moved relative to the feed outlet 118, e.g., by the positioning system 120. That is, in some embodiments, the build portion of the contiguous, preformed material 106 essentially remains fixed in space as the build surface 130 (and the attachment portion 130') is moved by the positioning system 120 relative to the feed outlet 118. In one embodiment, the contiguous, preformed material 106 is selectively heated to a viscous state by the hot spot 126. The term "selectively heated" means that the entire contiguous, preformed material 106 dispensed into the build zone 104 or just selected sections (or build portions) of the preformed material 106 dispensed into the build zone 104 may be heated to the viscous state. This also means that the hot spot 126 has to be controllable. For example, it should be possible to turn the hot spot 126 on or off or to control the temperature and size of the hot spot 126. According to some aspects, it is also possible to control the power density within the hot spot 126 as a function of time. In one embodiment, the contiguous, preformed material 106 is selectively heated to a temperature between the annealing point and up to the melting point of the material by the hot spot 126.

In one embodiment, the hot spot 126 is created using one or more laser beams from a laser delivery system, generally identified by the reference numeral 134. As an example, FIG. 1C shows that two laser beams 128A, 128B emanating from lasers 134a and 134b (see FIG. 1) of the system 134, respectively, are used to create the hot spot 126 in one embodiment. The laser beams 128A, 128B approach the build zone 104 from opposed directions. Such opposed laser beams will enable uniform heating around the diameter or thickness of the contiguous, preformed material 106 at the hot spot 126. In one embodiment, the laser beams 128A, 128B provided by the laser delivery system 134 are Gaussian beams, and the beam diameter of the laser beams 128A, 128B at the hot spot 126 can be controlled. In one embodiment, the beam diameter of each laser beam 128A, 128B is selected from a range between 1 to 2 times the thickness of the contiguous, preformed material 106 to be processed by the hot spot 126.

Figure 4A:
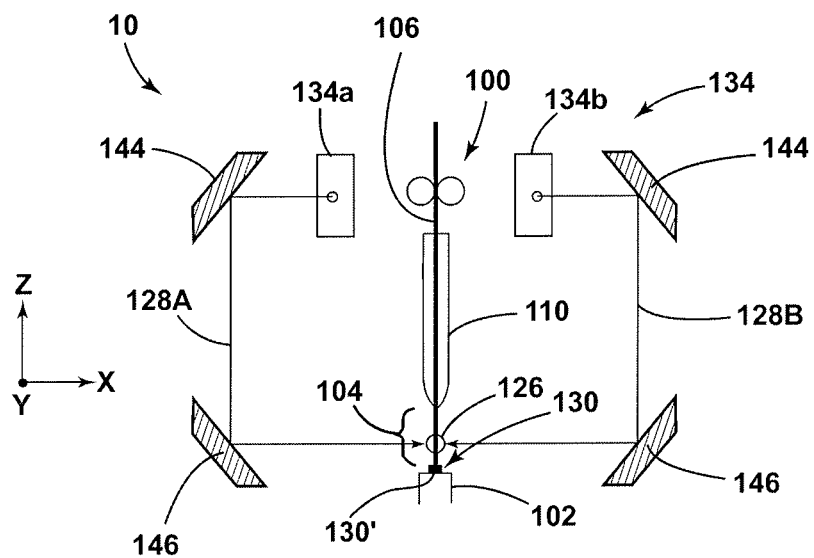
FIG. 4A is a schematic of a laser delivery system according to an embodiment that can be employed in the apparatus depicted in FIG. 1.

FIG. 4A depicts an embodiment of the laser delivery system 134, as employed in the system 10 for making a 3D object (see FIGS. 1-1C). As shown in FIG. 4A, the laser delivery system 134 includes a plurality of laser sources 134a and 134b, which generate laser beams 128A and 128B, respectively. In some aspects, the laser beams 128A, 128B are oriented in opposing or different directions (see FIG. 4A); in other aspects, the laser beams 128A, 128B are oriented in the same or similar directions (not shown). As the contiguous, preformed material 106 may be made of a glass, a glass-ceramic, or a ceramic material, the laser sources 134a, 134b may be infrared lasers capable of generating infrared laser beams, such $CO_2$ lasers and the like. In general, the plurality of laser sources 134a, 134b, etc. should be capable of generating a laser beam in a wavelength range in which the contiguous, preformed material 106 will be absorbing so as to allow the preformed material 106 to be selectively heated to a viscous state. For example, a $CO_2$ laser that emits wavelengths within the absorption range of glass and can be used for processing of glass materials employed as the contiguous, preformed material 106. In embodiments, different lasers that emit different wavelengths to coincide with the absorption range of a particular glass composition being formed may be selected and used. In embodiments, the glass absorbs at least about 20% or more, or even 30% or more, of a wavelength or wavelength range emitted by the laser. In some aspects, the laser delivery system 134 can employ a single laser source (e.g., either laser source 134a or 134b, for example) and a beam splitter (not shown in FIG. 4A) that is arranged to split the laser beam from the single laser source into two separate laser beams 128A, 128B traveling in different directions, e.g., in orthogonal directions. In other aspects, the laser delivery system 134 employs one or more laser sources, e.g., laser source 134a, 134b, arranged to direct one or more respective beams, e.g., 128A, 128B that, ultimately, reach the build zone 104 and form or otherwise develop the hot spot 126.

In the arrangement shown in FIG. 4A, the first laser beam 128A can be directed to contribute to the formation of the hot spot 126 in the build zone 104 by means of mirrors 144, 146. In some embodiments, one or more focusing lenses (not shown) can be employed in front of, between and/or after the mirrors 144, 146 to further focus the laser beam 128A toward the build zone 104 and form the hot spot 126. Similarly, the second laser beam 128B can be directed to contribute to the formation of the hot spot 126 in the build zone 104 by means of mirrors 144, 146 and any focusing lens or lenses (not shown). Together, in the embodiment depicted in exemplary form in FIG. 4A, the focused laser beams 128A, 128B form the hot spot 126 within which the preformed material 106 can be selectively heated to a viscous state.

Variations to the laser delivery systems 134 are possible. One variation according to the disclosure is to use beam shapers to shape the laser beams 128A and/or 128B focused into the build zone 104 into a non-round shape, such as a rectangular shape or an elliptical shape. Such non-round shapes may be useful when the contiguous, preformed material 106 is a flat fiber or the side of the preformed material 106 in opposed relation to the laser beam is flat. Another variation is to use more than two laser delivery paths within the hot zone 126 to deliver laser beams to the preformed material 106 at different locations within the build zone 104, e.g., in the X, Y or Z directions. This variation may be useful if the preformed material 106 is a thin sheet or has a relatively large width compared to the spot size of the laser beam (or combined beam). For example, laser beams may be delivered to one side of the preformed material 106 along multiple beam paths and to the other side of the preformed material 106 along multiple beam paths by employing multiple lasers, beam splitters and/or mirrors within the laser system 134. Another variation is to employ a shutter system (not shown in FIGS. 1-1C) within the laser delivery system 134 to control the timing and power density of the laser beams entering the build zone 104 and forming the hot spot 126. More particularly, the shutter system can be placed in the path of the laser beam(s) that emanate from the laser delivery system 134 to ensure that a beam introduced into the build zone 104 is at or near full power density upon initiation. As many laser sources require a lag time between activation and full power density, the use of a shutter system can allow a laser to reach full power density before allowing the beam to pass through the shutter system and into the build zone 104. Such precise control over the timing and power density of the laser beams emanating from the laser delivery system 134 can improve temperature uniformity and viscosity control of the contiguous, preformed material 106 during formation of a 3D object with the system 10.

As also depicted in FIGS. 1-1C, the system 10 for making a 3D object can employ a laser delivery system 134 with one or more secondary lasers, e.g., secondary laser source 134c. The secondary laser source 134c can introduce a beam, e.g., through the same or similar optics as employed with the laser sources 134a, 134b, into the build zone 104 to form a secondary hot spot that is distinct from the hot spot 126. This secondary hot spot can be employed by the system 10, for example, to ablate, carve, tunnel or otherwise form additional features from the 3D object, including but not limited to cavities, irregular surfaces, holes, channels and other comparable features. Such a secondary laser source 134c can also be employed to separate one or more build portions of the 3D object being formed by the system 10 from the contiguous, preformed material 106 during a process of making it. For example, the secondary laser source 134c can be used to separate the contiguous, preformed material 106 (e.g., as fed from the feed system 100) from a portion of the 3D object formed by the system 10; and then other laser sources, e.g., laser sources 134a, 134b, can be employed by the laser delivery system 134 to re-attach the contiguous, preformed material 106 to the prior-formed portion of the 3D object, at a different location, to begin forming other features associated with the final, desired 3D object.

Referring again to the system 10 for making a 3D object depicted in FIGS. 1-1C, the hot spot 126 is created in the build zone 104 at a select location between the feed outlet 118 and the build surface 130, i.e., top surface, of the pedestal 102. It is preferable that the hot spot 126 is not created on the build surface 130 of the pedestal 102 or within the pedestal 102 since this can cause undesired heating and/or ablation of the pedestal 102. It is also preferable to develop the hot spot 126 at a position (e.g., in the Z direction) in the build zone 104 between the build surface 130 and the feed outlet 118. It is also preferable for the laser delivery system 134 to develop the hot spot 126 in the build zone 104 at a location in proximity to the build surface 130 of the pedestal 102 during an initial step of attaching an end of the contiguous, preformed material 106 to the build surface. At other stages of developing an object with the system 10, the hot spot 126 is developed within the build zone 104 such that it changes its position changes relative to the build surface 130 of the pedestal 102. For example, the positioning system 120 can move the pedestal 102 and its build surface 130 relative to the hot spot 126 such that new portions of the contiguous, preformed material 106 are selectively heated to a viscous state to form the desired 3D object. More generally, it is preferable for the laser delivery system 134 to configure the hot spot 126 such that it is fixed, or substantially fixed, in its location relative to the feed outlet 118, e.g., in systems 10 which effect creation of the object through motion of the pedestal 102 relative to a fixed feed outlet 118.

In one embodiment of the system 10 for making a 3D object depicted in FIGS. 1-1C, the grazing angles of the laser beams, i.e., the angles between the laser beams 128A, 128B and the build surface 130 of the pedestal 102, are selected such that the laser beams 128A, 128B will not impinge on the build surface 130 of the pedestal 102, even if the pedestal is in close proximity to the build surface 130 as during an initial step of attaching an end of the preformed material 106 to the build surface of the pedestal. This is to avoid creation of a hot spot on the build surface 130 of the pedestal 102 or within the pedestal 102. The laser beams 128A, 128B may be parallel or at shallow angles (near parallel) to the build surface 130 to avoid impinging on the build surface 130 of the pedestal 102. The appropriate shallow angles can be determined by geometry.

As depicted in FIGS. 1-1C, the system 10 for making a 3D object includes a furnace 132 that may be fixed in position, enclosing the build surface 130 (including all or portions of the pedestal 102), the build zone 104 and the feed outlet 118. As also shown in FIGS. 1-1C, the furnace 132 can include one or more viewing openings 132a for viewing the 3D object as it is being formed by the system 10. In some aspects, the viewing openings 132a can be cut-outs from the furnace or transparent windows comprising a suitably transparent, refractory material. Also, as shown in FIG. 1B, the furnace 132 can include an opening 132b to accommodate the positioning system 120 and the pedestal 102, including motion of these elements. Similarly, as shown in FIGS. 1B and 1C, the furnace 132 can include one or more openings 133a, 133b sized to allow passage of the laser beam(s) (e.g., laser beams 128A, 128B) from the laser delivery system 134 into the build zone 104 to form the hot spot 126, for example. In addition, a thermal camera 180 (see FIGS. 1, 1B), such as a FLIR® camera, can be employed in the system 10 to monitor the temperatures of the furnace 132, along with the feed system 100 above the furnace 132. More particularly, the furnace 132 can be employed by the system 10 to create a controlled thermal environment around the build surface 130, the build zone 104, and the feed outlet 118. Data received from the thermal camera 180 can also aid in the creation of this controlled, thermal environment. The controlled thermal environment may allow the build surface 130 (and the pedestal 102) to be maintained in a certain temperature range while the contiguous, preformed material 106 is being attached to the attachment portion 130' and/or the build portion of the contiguous, preformed material 106 is being formed in the build zone 104 by the hot spot 126. The controlled thermal environment may minimize stresses in the contiguous, preformed material 106 attached to the pedestal 102 at the attachment portion 130' by preventing rapid cooling of the material, particularly given that the preformed material 106 is a glass, a glass-ceramic or a ceramic.

The controlled thermal environment of the furnace 132 depicted in FIGS. 1-1C also may facilitate bonding of the contiguous, preformed material 106 to the build surface 130. For example, a controlled thermal environment can be created by the furnace 132 to ensure that a build surface 130 comprising a glass, glass-ceramic or ceramic material is sufficiently viscous, or at an otherwise sufficiently elevated temperature, to facilitate bonding with an end of the contiguous, preformed material 106. In one embodiment, the pedestal 102, including the build surface 130, is made of a glass or glass-ceramic material, and the furnace 132 is employed by the system 10 to maintain the temperature of the pedestal 102 at substantially the annealing point of the glass (i.e., the temperature at which the glass reaches a viscosity of $10^{13.4}$ Poise). As used herein in this context, the term "substantially" may mean, for example, within +/−20° C. of the annealing point of the glass or glass-ceramic. In another embodiment, the pedestal 102, including its build surface 130, is made of a glass-ceramic, and the furnace 132 is employed to maintain the temperature of the pedestal 102 to just below the sintering point of the glass-ceramic. For example, the glass-ceramic pedestal 102 may be maintained at 0.1 to 10° C. below the sintering point. Another possibility is to control the temperature of the pedestal 102, including its build surface 130, such that the temperature differential between the pedestal 102 and the contiguous, preformed material 106 emanating from the feed outlet 118 is minimized. Further, in some embodiments, the laser beams 128A, 128B may be used to preheat the build surface 130. For example, the laser beams 128A, 128B may impinge the build surface 130 comprising a glass, glass-ceramic or ceramic material to heat the build surface 130 to a sufficiently viscous level, or to an otherwise sufficiently elevated temperature, to facilitate bonding with an end of the contiguous, preformed material 106.

Referring again to the system 10 for making a 3D object depicted in FIGS. 1-1C, the feed system 100 can, according to some embodiments, include a pressure source 162 and/or a vacuum source 164 (see FIG. 1C) that may be connected to the preformed material 106 if the contiguous, preformed material 106 is a hollow fiber (e.g., a tube). A suitable control valve 163 may determine which of the pressure source 162 and vacuum source 164 is connected to the preformed material 106. While feeding the preformed material 106 into the build zone 104, pressure or vacuum can be selectively applied to the core of the preformed material 106 to expand or collapse the core, respectively. Typically, the expansion or collapse of the core will occur in the build zone 104, where the contiguous, preformed material 106 will be at a temperature at which it can be shaped due to the heating by the hot spot 126. This process will allow further shaping of a build portion of the contiguous, preformed material 106 as it is formed into the 3D object by relative motion between the build surface 130 and the feed outlet 118.

As also shown in FIGS. 1-1C, the system 10 for making a 3D object may also include a controller 95 that manages the building of the 3D object using an "object creation pattern," for example. As used herein, the "object creation pattern" is based at least in part on a description of the desired 3D object to be made by the system 10. Such a description can be developed through various means, including but not limited to computer aided design (CAD) software, manual inputs, and other descriptive approaches for a 3D object. Further, the "object creation pattern" employed by the controller 95 can include inputs related to the type of contiguous, preformed material(s) 106, the feed rate employed by the feed system 100 to deliver the preformed material 106, laser power associated with the laser delivery system 134, etc. Accordingly, the controller 95 can be coupled (e.g., through wiring or wireless approaches) to the feed system 100, furnace 132, laser delivery system 134, positioning system 120 and other aspects of the system 10 (e.g., a thermal camera 180, if present) for making a 3D object. The controller 95 may read the object creation pattern from a suitable storage, an application, software and/or through user input. The controller 95 may make various decisions as to when and where to send command signals in the system 10 through its coupling to one or more components of the system 10. For example, the controller 95 may send signals to the feed system 100 to feed one or more contiguous, preformed materials 106 into the build zone 104 at a specified feed rate. The controller 95 may also send signals to the laser delivery system 134 to deliver the laser beams 128A, 128B at the appropriate power level to achieve the hot spot 126. In some embodiments, the controller 95 may also send signals to the laser delivery system 134 to intermittently deliver the laser beams 128A, 128B (e.g., cycle the laser beams 128A, 128B on and off) to prevent heating or reheating certain portions of the build surface 130 and/or the contiguous, preformed material 106, for example, previous build locations.

During development of the build portion(s) of the 3D object being created by the system 10 from the contiguous, preformed material 106, the controller 95 may send signals to the positioning system 120 to move the build surface 130 relative to the feed outlet 118 in a particular pattern associated with the object creation pattern. The controller 95 may also send signals to the positioning system 120 to adjust the distance between the hot spot 126 and the build surface 130 and/or the feed outlet 118. The controller 95 may also send signals to the control valve 163 to connect either of the pressure source 162 and vacuum source 164 to the preformed material 106. The controller 95 may also send signals to the furnace 132 to maintain the build surface 130, pedestal 102 and/or feed outlet 118 at a certain temperature. An alternative to controlling the positioning system 120 via the controller 95 is to connect the positioning system 120 to a drawing tool. In this case, the build portion of the contiguous, preformed material 106 can be created with the drawing tool and then translated by the positioning system 120 into relative motion between the build surface 130 and the feed outlet 118. Furthermore, the controller 95 may send signals to the feed system 100 to control rotational motion of the feed source 115.

According to embodiment of the disclosure, a method of making a 3D object can include the following steps (all of which may be conducted by the system 10 depicted in FIGS.

1-1C): developing a hot spot 126 in a build zone 104 located between a feed outlet 118 and a build surface 130; feeding a contiguous, preformed material 106 through the feed outlet 118 into the build zone 104 and using the hot spot 126 to selectively heat an attachment end of the contiguous, preformed material 106 to a viscous state; and attaching the attachment end in a viscous state to the build surface 130. For example, such an approach can be employed by a system that is consistent with the system 10 outlined in this disclosure for attaching an end of a contiguous, preformed material 106 to a build surface 130 during the initial stages of a method of making a 3D object. The method of making the 3D object can further include the steps: feeding the contiguous, preformed material 106 through the feed outlet 118 into the build zone 104 and using the hot spot 126 to selectively heat a build portion of the contiguous, preformed material 106 above the attachment end to a viscous state; and forming the object in the build zone 104 by effecting relative motion of the build portion (e.g., of the preformed material 106) and the feed outlet 118 according to an object creation pattern. Further, the object creation pattern can be based at least in part on a description of a three-dimensional object. For example, such an approach can be employed by the system to develop a 3D object from a build portion of the contiguous, preformed material 106, as formed within the hot spot 126 and residing above the attachment portion 130' of the build surface 130 of the pedestal 102 in the system 10, as shown in FIGS. 1-1C.

In certain implementations of the foregoing methods, the step of developing the hot spot 126 can comprise directing at least one laser beam, e.g., laser beam 128A and/or 128B, into the build zone 104. The developing step can also include directing at least two laser beams 128A, 128B into the build zone 104, the at least two laser beams being arranged to approach the build zone 104 from different directions (see, e.g., FIGS. 1C and 4A). According to other implementations of the foregoing methods of making a 3D object, the forming step can be conducted by effecting relative motion of the build portion of the contiguous, preformed material 106 (e.g., as residing above the pedestal 102) and the feed outlet 118 in three orthogonal directions, e.g., by the positioning system 120, according to the object creation pattern. The forming step can additionally include effecting relative motion of the build portion and the feed outlet 118 in at least one of a rotational direction and a tilt direction according to the object creation pattern. In some embodiments, the method may further include rotating the feed source 115 to rotate the contiguous, preformed material 106. It should also be understood that any or all of the foregoing steps, along with comparable derivatives of them, can be conducted by a controller, such as the controller 95 employed in the system 10 for making a 3D object.

A process for making a 3D object according to one embodiment may include the preparation of an object creation pattern, used in the forming of the 3D object. In one embodiment, the object creation pattern may be based on 2D or 3D geometric data associated with the desired 3D object. This geometric data can include various layers, sections and features. The features may be, for example, partial-depth holes, through-holes, channels, voids, engraved marks, and the like. The object creation pattern may also include other information such as thickness of various portions of the 3D object. According to another embodiment, the object creation pattern can be described as a single component or set of sections that are created by a system for making a 3D object, such as the system 10 disclosed herein, using a suitable drawing or illustration tool. Each component or section of the object creation pattern can be drawn prior to (e.g., and stored within a computer) or as the 3D object is being formed.

In another embodiment, the object creation pattern used to form the 3D object may be described by constructing a model of the 3D object using a CAD software (or, in general, solid modeling software). The CAD software may output a .stl file containing a tessellated model of the 3D object. A tessellated model is an array of triangles representing the surfaces of the CAD model. The .stl file would contain the coordinates of the vertices of these triangles and indices indicating the normal of each triangle. The tessellated model may be apportioned into various sections using a suitable sectioning software, where each section would represent a portion of the 3D object. In another embodiment, the 3D object may be formed from an object creation pattern derived from a scan (e.g., using computed tomography ("CT") techniques) of a prototype or other representation of the desired 3D object. The scan can be converted into an object creation pattern by a suitable software system as understood by those with ordinary skill in the field of the disclosure.

A method of making the 3D object, e.g., by the system depicted in FIGS. 1-1C, may include determining the type of contiguous, preformed material(s) 106 to be used in forming the build portion of the 3D object. The method for making the 3D object may include using geometric data associated with the 3D object, and one or more types of preformed material(s) 106 to be used for all or portions of the object, in developing an object creation pattern. The process for making the 3D object may include developing the object creation pattern such that each portion (e.g., a main body, appendages, etc.) of the object can be created by virtue of relative motion between the build surface 130 (e.g., of a pedestal 102) and the feed outlet 118. The process for making the 3D object may also include developing the object creation pattern such that each of the portions of the 3D object are created according to specified, and variable laser power levels within the hot spot 126. Such variable laser power levels in the object creation pattern can be based on the particular types of contiguous, preformed materials 106, the feed rate of the preformed material 106 into the build zone 104 based on the preformed material type, the spatial aspects of the object creation pattern, the location of the hot spot 126 relative to the feed outlet 118 and the build surface 130, and other factors. The location of the hot spot 126 and laser power can be selected to achieve full transparency when working with glass or glass-ceramic contiguous, preformed materials 106. For example, fully transparent glass may be achieved if the temperature of the hot spot 126, as determined by the laser power used in creating the hot spot 126, is set to just below the melting point of the preformed material 106 comprising glass, e.g., 5 to 10° C. below the melting point.

According to an embodiment of the method of making a 3D object, a portion of the contiguous, preformed material 106 can be grafted, attached or otherwise bonded to the attachment portion 130' of a build surface 130 of the pedestal 102. To do so, the hot spot 126 is created between the feed outlet 118 and the build surface 130. The laser power delivered to the hot spot 126 will depend on the contiguous, preformed material(s) 106 to be used in this stage of the method of making the 3D object. The hot spot distance, i.e., the distance between the hot spot 126 and the build surface 130, and the deposition distance, i.e., the distance between the feed outlet 118 and the build surface 130, are set to predetermined values, which may be based on the object creation pattern. For example, if forming a fully transparent glass object, the hot spot distance may be in a range from about ⅓ to about 1 times the thickness (or diameter) of the contiguous, preformed material 106. At this point, the contiguous, preformed material 106 is fed (e.g., via feed system 100) into the build zone 104 and the hot spot 126 to selectively heat it to a viscous state (e.g., to a temperature between the annealing point and up to the melting point of the preformed material 106). As the preformed material 106 is moved downward through the hot spot 126, it is placed in contact with the attachment portion 130' of the build surface 130 of the pedestal 102, thereby joining the contiguous, preformed material 106 to the build surface 130. Relative motion between the feed outlet 118 and the build surface 130 can control how the portion of the contiguous, preformed material 106 is grafted, attached or otherwise bonded to the attachment portion 130' of the build surface 130. In certain aspects, any translation of the feed outlet 118 should be synchronized with the focal points of the laser beams (e.g., laser beams 128A, 128B) from the laser delivery system 134 such that the hot spot 126 is properly aligned with the feed outlet 118. To the extent that the relative motion between the feed outlet 118 and the build surface 130 is restricted to moving the pedestal 102 and its build surface 130 relative to a fixed, feed outlet 118, then it may not be necessary to adjust the position of the laser beams emanating from the laser delivery system 134 in forming the hot spot 126.

After a portion of the contiguous, preformed material 106 is bonded to the attachment portion 130' of the build surface 130, the remaining main portion of the 3D object can be formed. As noted earlier, the features of the 3D object can be formed according to an object creation pattern. More particularly, the build portion of the contiguous, preformed material 106 can be moved within the hot spot 126 to selectively heat it to a viscous state. This motion of the build portion is effected relative to the feed outlet 118, e.g., by the positioning system 120 according to an object creation pattern. As portions of the preformed material 106 are heated to a viscous state in the hot spot 126 within the build zone 104 by virtue of movement of the portions relative to the feed outlet, the 3D object is 'drawn' in space. For example, the positioning system 120 can move the pedestal 102, its build surface 130 and the end of the preformed material 106 bonded to the build surface 130 (i.e., at the attachment portion 130') to drag portions of the preformed material through the hot spot 126 to successively heat these portions to a viscous state. Over time, this process can be employed to 'draw' the full 3D object in space. As noted earlier, the process can also include breaking portions of the preformed material 106 (e.g., by use of a secondary laser, increasing the relative motion of the build surface 130 relative to the feed outlet 118); and then building additional portions of the 3D object by reattaching the contiguous, preformed material(s) 106 to particular, prior-formed locations on the 3D object.

After the 3D object has been formed according to the foregoing method and/or system (e.g., system 10 depicted in FIGS. 1-1C), the 3D object may be annealed to prevent any residual stresses from developing inside the bulk of the object. This may be a useful step given that the 3D object includes one or more of a glass, a glass-ceramic or a ceramic. For glass, the annealing process may include heating the 3D object until the temperature reaches the annealing temperature (also called annealing point) at a viscosity of $10^{13.4}$ Poise, where the glass is still too hard to deform but soft enough for the stresses to relax. The 3D object is then allowed to heat-soak until its temperature is even throughout. The time necessary for this step varies depending on the type of glass and the maximum thickness of the object. The object is then slowly cooled at a predetermined rate until its temperature is below the strain point (viscosity of $10^{14.5}$ Poise). Following this, the temperature can be safely lowered to room temperature at a rate limited by the heat capacity, thickness, thermal conductivity, and thermal expansion coefficient of the glass employed in the contiguous, preformed material 106. After the annealing process, the 3D object can be cut to size, drilled, etched, or polished. In some embodiments, after the 3D object has been formed according to the foregoing method and/or system (e.g., system 10 depicted in FIGS. 1-1C), the laser beams 128A, 128B may impinge the object again to polish the object using a remelt process.

An additional step may be taken to separate the 3D object from the build surface 130 of the pedestal 102 if the pedestal 102 is not desired as part of the final 3D object. One possible method for doing this is to make the pedestal 102 and the build surface 130 of a material that is different from that of the 3D object (or the contiguous, preformed material(s) 106 used in building the 3D object) and then separate the pedestal 102 and the build surface 130 from the 3D object by selective etching. In one embodiment, the pedestal 102, and its build surface 130, may be made of a glass that is soluble in a select solvent, and the 3D object may be made of glass or glass-ceramic that is insoluble in the select solvent. In this case, the pedestal 102 can be removed from the 3D object by dissolving the pedestal 102 in the select solvent. Another possible method is to separate the pedestal 102 from the 3D object by machining techniques, such as grinding, polishing, and the like.

Figure 2:
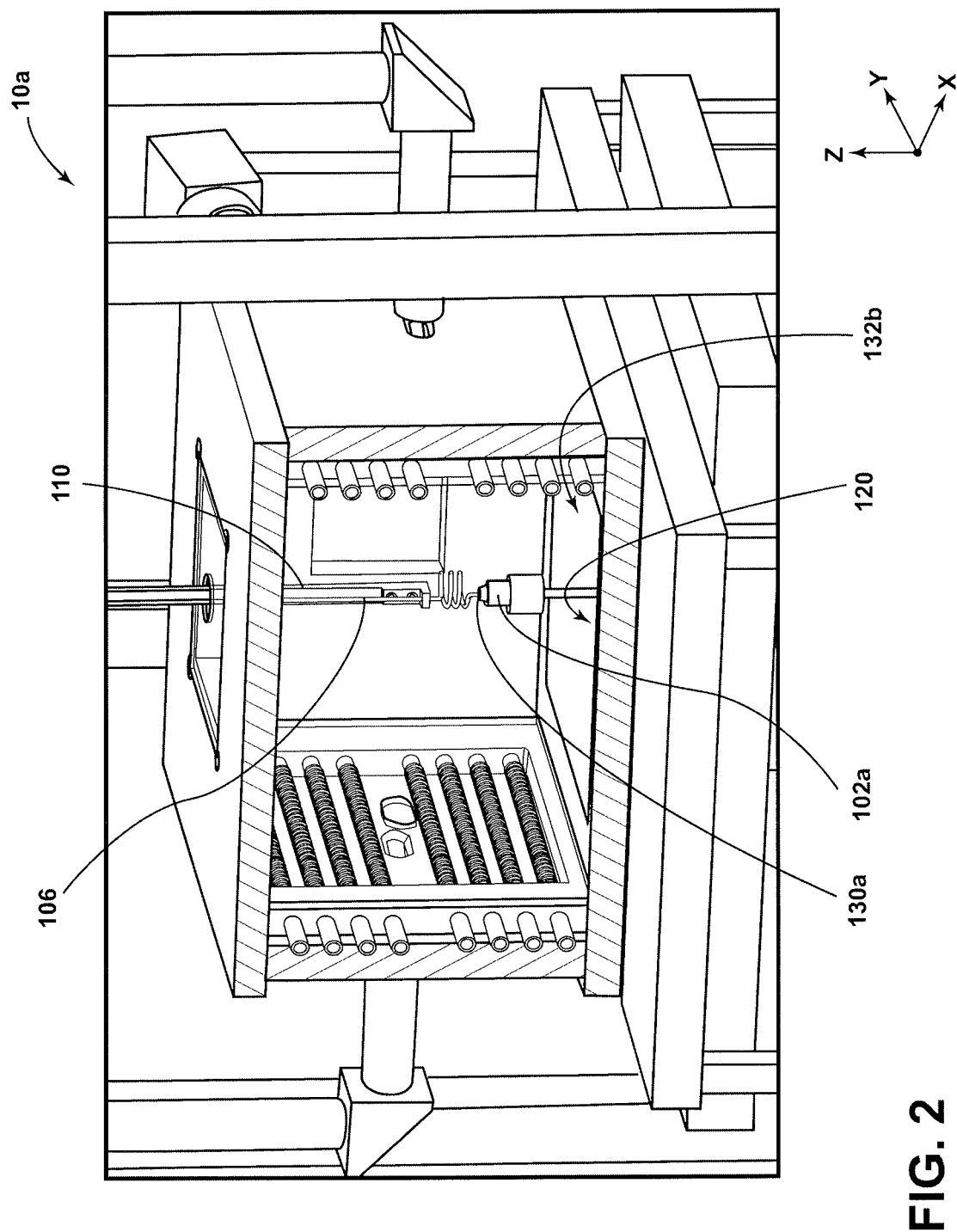
FIG. 2 is a schematic, cross-sectional perspective view of an apparatus comprising a gripping fixture having a grip surface for making a three-dimensional object comprising a glass, glass-ceramic or ceramic material according to another embodiment.
Figure 2A:
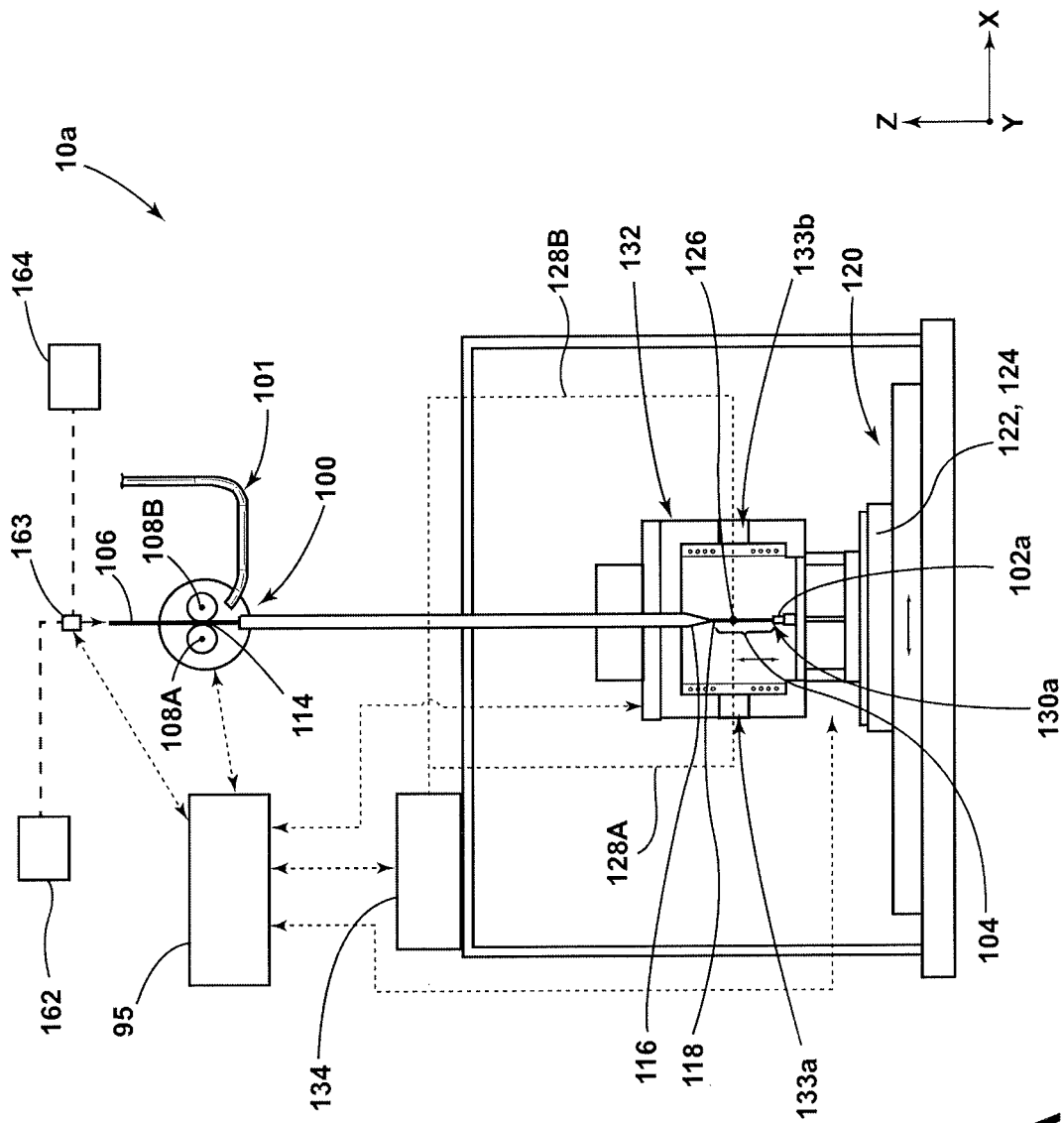
FIG. 2A is a schematic view of the apparatus depicted in FIG. 2.
Figure 4B:
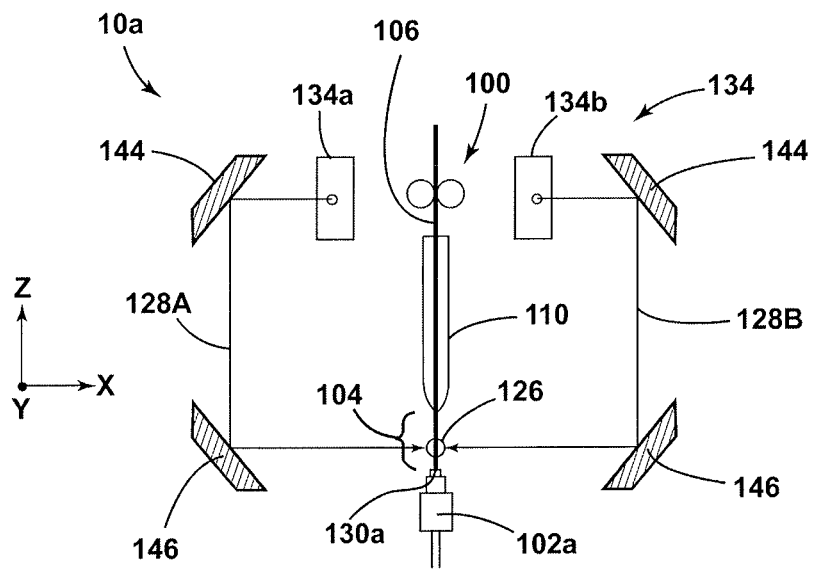
FIG. 4B is a schematic of a laser delivery system according to an embodiment that can be employed in the apparatus depicted in FIG. 2.

Referring now to FIGS. 2, 2A and 4B, an embodiment of a system 10a for making a 3D object is depicted. In general, the system 10a for making a 3D object is similar to the system 10 depicted in FIGS. 1-1C, and like-numbered elements of these systems (e.g., feed system 100, laser delivery system 134, etc.) have the same or similar structure and function within these systems. A principal difference between the two systems, 10 and 10a, is that the former system employs a pedestal 102 with a work surface 130 and the latter system employs a gripping fixture 102a with a grip surface 130a. Various gripping fixtures 102a with grip surfaces 130a can be employed in system 10a, including arrangements similar to the chucks that are typically employed in standard hand-held drills. Another difference between the two systems is that the furnace 132 is optional in the system 10a. In other respects, the systems 10, 10a are configured similar to one another.

Notwithstanding the similarities between system 10 and system 10a, the provision of the gripping fixture 102a and its grip surface 130a in system 10a gives it certain advantages. For example, a method of making a 3D object with the system 10a does not require any steps or sequences involved in attaching an end of the contiguous, preformed material 106 to a build surface. Instead, the end of the contiguous, preformed material 106 can be installed at ambient temperature within the grip surface 130a of the gripping fixture 102a, without the need to heat the end to a viscous state in the hot spot 126, for example. Another advantage of the system 10a is that the relatively small size of the gripping fixture 102a and its grip surface 130a allows it to be moved, e.g., by the positioning system 120, relative to the feed outlet 118 in nearly an unlimited fashion. More particularly, the grip fixture 102a and its grip surface 130a (i.e., as holding an end of the contiguous, preformed material 106) can be moved relative to the feed outlet 118 such that these features even reside above the feed outlet 118 in the Z direction.

Accordingly, methods of making 3D objects that employ the system 10*a* have added flexibility in terms of fabricating the 3D object in space. On the other hand, the system 10 has some advantages over the system 10*a* for making 3D objects. As the system 10 employs a pedestal 102 with a build surface 130, it can be employed by various methods to fabricate a plurality of 3D objects on the build surface 130 in one manufacturing sequence. That is, multiple 3D objects can be formed on the build surface 130 of the pedestal through the foregoing attaching and developing aspects of the methods of making 3D objects employing the system 10. Further, the build surface 130 and/or the pedestal 102 can be incorporated into the 3D object(s) formed with the system 10 and used to support complex or otherwise weighty 3D objects.

According to embodiment of the disclosure, a method of making a 3D object can include the following steps (all of which may be conducted by the system 10*a* depicted in FIGS. 2, 2A and 4B): developing a hot spot 126 in a build zone 104 located between a feed outlet 118 and a grip surface 130*a* (e.g., from a grip fixture 102*a*); and attaching an end of a contiguous, preformed material 106 to the grip surface 130*a* during the initial stages of a method of making a 3D object. The method of making the 3D object can further include the steps: feeding the contiguous, preformed material 106 through the feed outlet 118 into the build zone 104 and using the hot spot 126 to selectively heat a build portion of the contiguous, preformed material 106 above the attachment end to a viscous state; and forming the object in the build zone 104 by effecting relative motion of the build portion (e.g., of the preformed material 106) and the feed outlet 118 according to an object creation pattern. Further, the object creation pattern can be based at least in part on a description of a three-dimensional object. For example, such an approach can be employed by the system to develop a 3D object from a build portion of the contiguous, preformed material 106, as formed within the hot spot 126 and residing above the grip surface 130*a* of the grip fixture 102*a* in the system 10*a*, as shown in FIGS. 2, 2A and 4B.

More generally, the foregoing method of making a 3D object can be employed with a system that includes a gripping fixture and grip surface, such as system 10*a*, according to the same or similar methodologies that were outlined earlier in the disclosure associated with the method of making a 3D object with a system employing a pedestal and a build surface, such as system 10. However, the method that can be employed with a system having a gripping fixture 102*a* and grip surface 130*a* is preferably employed to effect relative motion of the build portion of the contiguous, preformed material 106 to the feed outlet 118 by direct movement of the gripping fixture and grip surface in orthogonal, rotational and/or tilt directions. As also noted earlier, such methods can also be conducted such that the effecting relative motion comprises positioning the grip surface (e.g., grip surface 102*a*) above the build zone 104 according to the object creation pattern. Further, this embodiment may also comprise a feed source (such as the feed source 115 of FIGS. 1-1C) that is rotatable.

Figure 3:
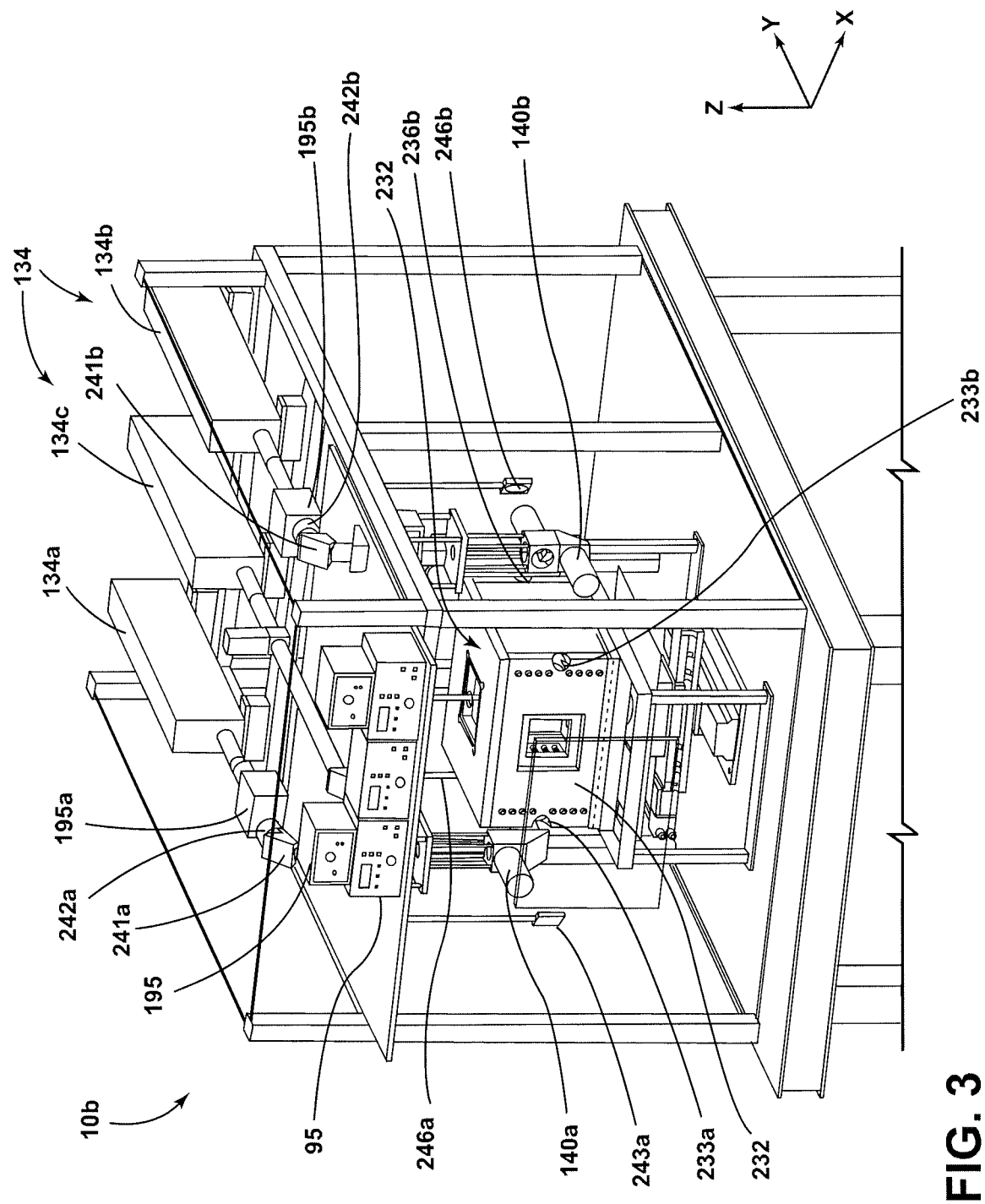
FIG. 3 is a schematic, perspective view of an apparatus with two lasers that produce four beams for making a three-dimensional object comprising a glass, glass-ceramic or ceramic material according to another embodiment.
Figure 3A:
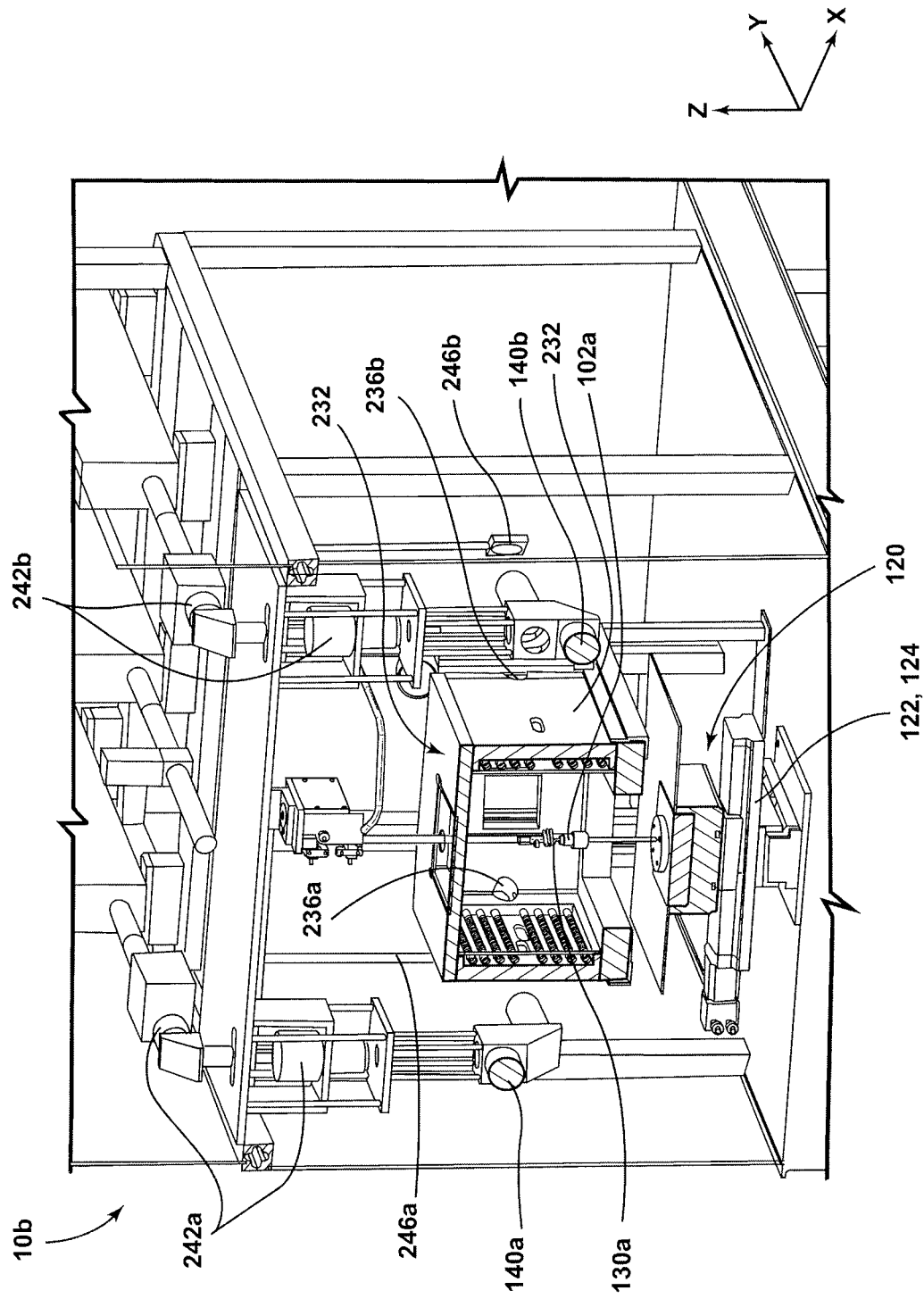
FIG. 3A is a schematic, cross-sectional view of the apparatus depicted in FIG. 3.
Figure 4C:
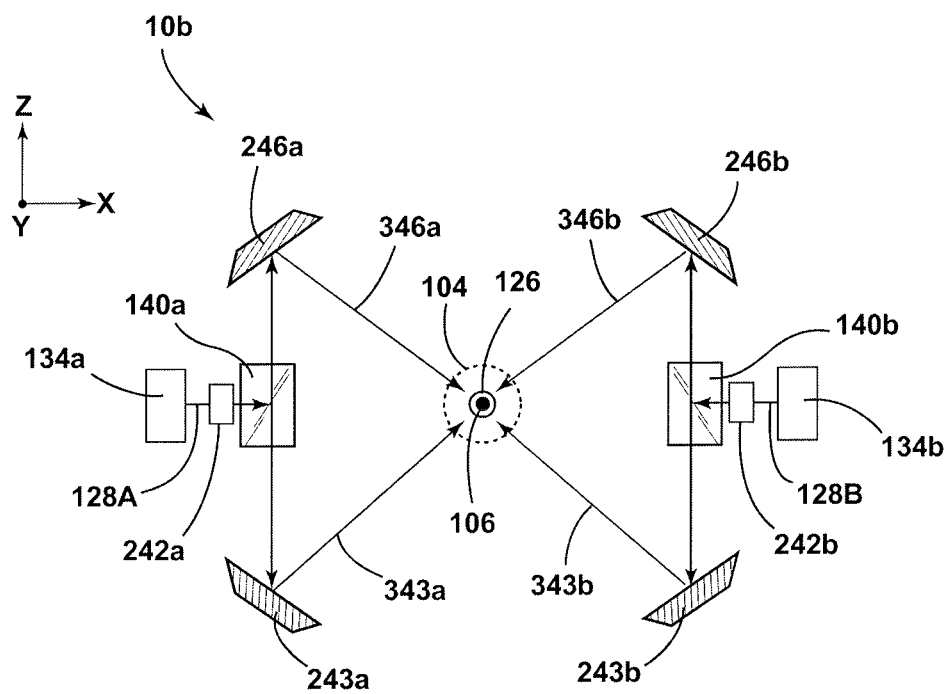
FIG. 4C is a schematic of a laser delivery system according to an embodiment that can be employed in the apparatus depicted in FIG. 3.

Referring now to FIGS. 3, 3A and 4C, an embodiment of a system 10*b* for making a 3D object is depicted. In general, the system 10*b* for making a 3D object is similar to the system 10*a* depicted in FIGS. 2, 2A and 4B, and like-numbered elements of these systems (e.g., controller 95, positioning system 120, laser delivery system 134) have the same or similar structure and function within these systems. In system 10*b*, however, the optics associated with the laser delivery system 134 and the furnace 232 are configured to optimize uniform heating of the contiguous, preformed material 106 in the hot spot 126. With regard to the furnace 232, it includes a plurality of openings 233*a*, 233*b*, 236*a*, and 236*b* sized to allow passage of laser beams into the build zone 104 to form a hot spot 126. These openings are located at the corners of the furnace 232; however, some aspects of the system 10*b* can include openings in the faces or sides of the furnace 232 to achieve the same or similar functionality.

With regard to the optics of the laser delivery system 134 of the system 10*b* for making a 3D object depicted in FIGS. 3, 3A and 4C, two laser sources 134*a* and 134*b* can be employed (e.g., similar to the laser delivery system 134 employed in the system 10). However, the laser beams 128A, 128B emanating from these sources, respectively, are split by beam splitters 140*a*, 140*b* as shown in FIG. 4C. The split beams that are derived from beam 128A are reflected against mirrors 243*a*, 246*a* and directed to the build zone 104 as reflected beams 343*a*, 346*a*, respectively. Similarly, the split beams that are derived from beam 128B are reflected against mirrors 243*b*, 246*b* and directed to the build zone 104 as reflected beams 343*b*, 346*b*. Together, the reflected beams 343*a*, 343*b*, 346*a*, 346*b* combine to form the hot spot 126, which can be used to selectively heat the contiguous, preformed material 104 into a viscous state. The ability of the system 10*b* to direct four beams (or more) in the formation of a hot zone 126, spaced equally around the hot zone, ensures that the hot zone 126 has substantial uniformity in terms of temperature and power density. As is also shown in FIG. 3, additional mirrors 241*a*, 241*b* can be employed to direct the laser beams 128A, 128B from the laser sources 134*a*, 134*b* to the beam splitters 140*a*, 140*b*. In addition, focusing lenses, such as focusing lenses 242*a*, 242*b*, can also be employed to control the spot size of the laser beams 128A, 128B that emanated from the laser sources 134*a*, 134*b*. As would also be understood by those with ordinary skill, various combinations and quantities of laser sources (e.g., laser sources 134*a*, 134*b*), optics (e.g., mirrors 243*a*, 243*b*, etc.) and openings within the furnace 232 can be employed to generate a hot spot 126 with substantial temperature and power density uniformity within the build zone 104, as shown in FIG. 4C. It should also be recognized that methods of making 3D objects with apparatus, such as system 10*b*, can selectively activate one or more of the laser sources in the system to intentionally generate temperature and/or power density non-uniformities in the hot spot 126. For example, such non-uniformities in the hot spot 126 might be necessary to create particular shapes, cross-sections, and other features in view of particular composition of material(s) employed in the contiguous, preformed material(s) 106.

Figure 5A:
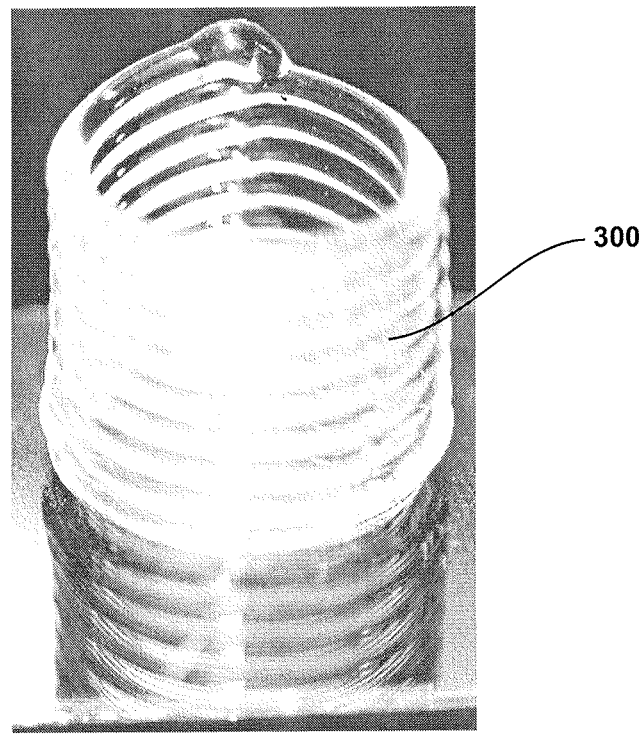
FIG. 5A is a photograph of a three-dimensional glass spring according to an embodiment, as made with an apparatus and method according to further embodiments.
Figure 5B:
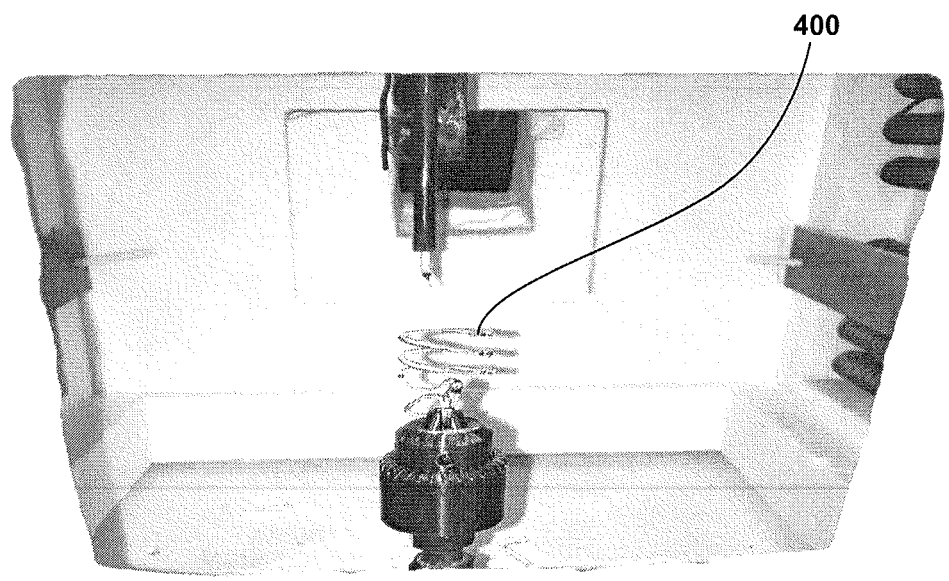
FIG. 5B is a photograph of a three-dimensional glass spiral according to an embodiment, as made with an apparatus and method according to further embodiments.
Figure 5C:
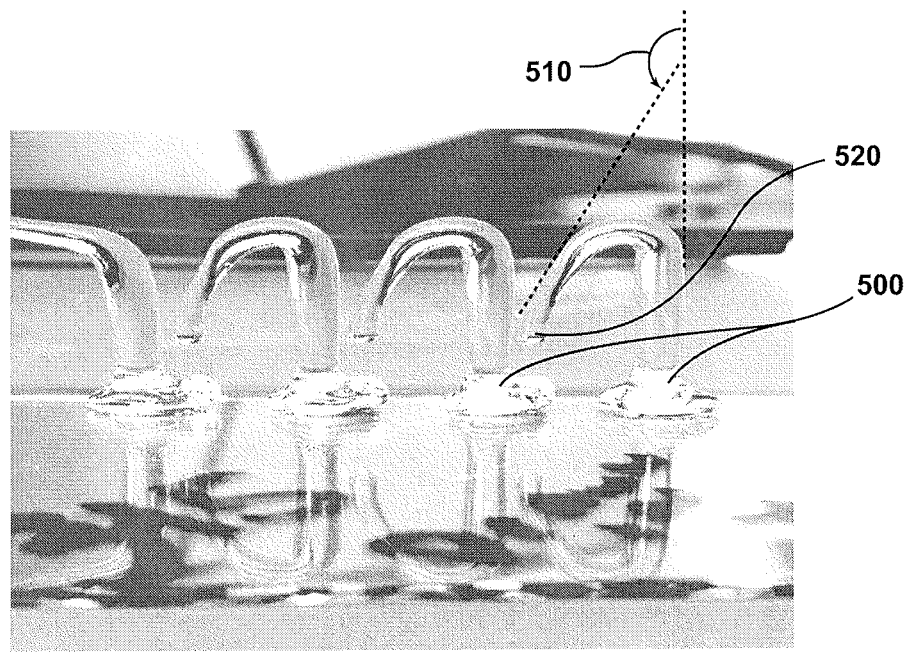
FIG. 5C is a photograph of a series of glass hooks with over-hang features according to an embodiment, as made with an apparatus and method according to further embodiments.
Figure 5D:
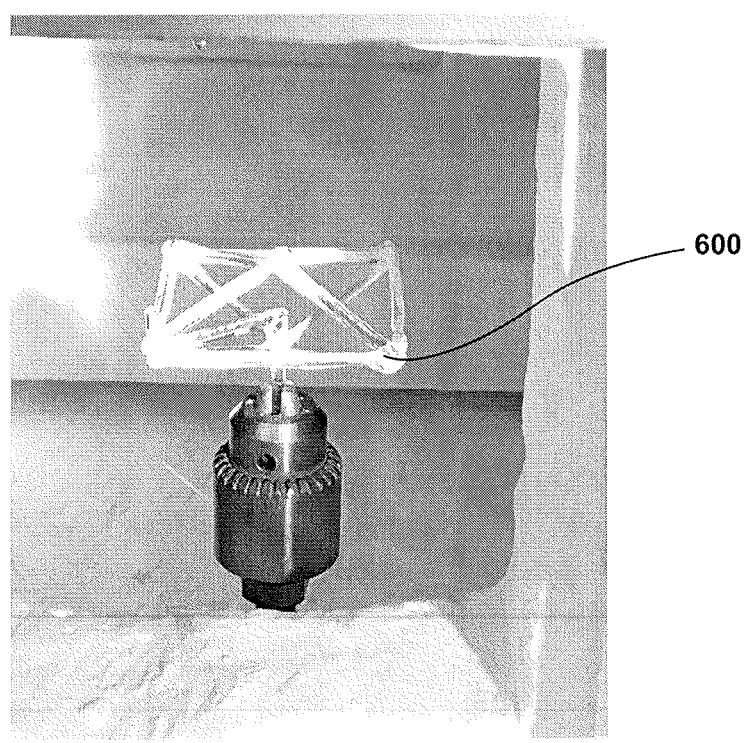
FIG. 5D is a photograph of a three-dimensional glass diamond according to an embodiment, as made with an apparatus and method according to further embodiments.

With further regard to the systems 10, 10*a*, 10*b* and associated methods of making 3D objects, a glass article (e.g., as shown in FIGS. 5A-5D) can be made with these systems and/or according to these methods that comprises a 3D object comprising a contiguous material, the material comprising a glass. For example, a spring 300 comprising glass, such as depicted in FIG. 5A, can be made with such methods and systems for making 3D objects. As shown in FIG. 5A, the spring 300 is formed in a continuous fashion from a contiguous silica rod, and bonded to a build surface, also comprising a glass composition. As another example, a spiral 400 comprising glass, such as depicted in FIG. 5B, can be made with such methods and systems for making 3D objects. As shown in FIG. 5B, the spiral 400 is formed in a continuous fashion from a contiguous silica rod, as gripped within a chuck. The glass articles can also include one or more over-hang features comprising the contiguous glass material, the feature defined by at least one member emanating from the object. For example, a series of hooks 500, such as depicted in FIG. 5C, can be made in a continuous fashion with such methods and systems from a pure silica rod, with the ends 520 of the hooks 500 being the over-hang features. Hooks 500 may include two or more segments. In some embodiments, at least one member or segment emanating from the object forms an angle of at least 90 degrees from another member or segment of the object. As depicted in FIG. 5C, the over-hang aspects (i.e., ends 520) of the hooks 500 form an angle 510 that is equal to or greater than 45 degrees, or equal to or greater than 60 degrees, or even equal to or greater than 90 degrees. Further, the glass article, such as the hooks 500, can be formed from any of the foregoing apparatus and methods for making a 3D object. As another example, a diamond structure 600, such as depicted in FIG. 5D, can be made in a nearly continuous fashion with the foregoing methods and systems from a pure silica rod. Notably, the foregoing methods and systems for making a 3D object can be employed to fabricate each of the legs and struts of the diamond structure 600 in a continuous fashion, followed by a break (e.g., at the end of a leg or strut) or continued movement in building the next leg or strut in which this next leg or strut shares an end point with the prior-made leg or strut. Advantageously, the spring 300 depicted in FIG. 5A, spiral 400 depicted in FIG. 5B, the hooks 500 depicted in FIG. 5C and the diamond structure 600 depicted in FIG. 5D can, in some implementations, comprise contiguous material (e.g., as derived from contiguous, preformed material 106) that is substantially free of internal interfaces.

Many variations and modifications may be made to the above-described embodiments of the disclosure without departing substantially from the spirit and various principles of the disclosure. All such modifications and variations are intended to be included herein within the scope of this disclosure and protected by the following claims.

What is claimed is:

1. An apparatus for making a three-dimensional object, comprising:
   a pedestal having a build surface;
   a feed system having a feed outlet positioned above the build surface, the feed system configured to feed a contiguous, preformed material into a build zone between the feed outlet and the build surface;
   a furnace enclosing the build surface, build zone and the feed outlet;
   a laser delivery system arranged to direct at least one laser beam into the build zone to form a hot spot in the build zone; and
   a positioning system arranged to effect relative motion between the build surface and the feed outlet,
   wherein the positioning system is arranged to affect the relative motion in three orthogonal directions, and wherein the pedestal is coupled to the positioning system.

2. The apparatus of claim 1, wherein the positioning system is further arranged to affect the relative motion in at least one of a rotational direction and a tilt direction.

3. The apparatus of claim 1, wherein the feed system is further configured to feed the contiguous, preformed material at a variable speed into the build zone.

4. The apparatus of claim 1, wherein the feed system further comprises a feed source that is rotatable about a feed axis of the contiguous, preformed material.

5. The apparatus of claim 1, further comprising:
   a cooling element positioned outside of the furnace, the cooling element configured to cool the contiguous, preformed material above the feed outlet.

6. The apparatus of claim 1, wherein the contiguous, preformed material comprises at least one of a glass, a glass-ceramic and a ceramic.

7. The apparatus of claim 6, wherein the contiguous, preformed material is in the form of a rod, a fiber, a tube, a sheet, a plate or a ribbon.

8. The apparatus of claim 1, further comprising:
   a controller coupled to the feed system, the laser delivery system and the positioning system,
   wherein the controller is configured to control the relative motion between the build surface and the feed outlet based at least in part on controller communication with the feed system, the laser delivery system and the positioning system.

9. An apparatus for making a three-dimensional object, comprising:
   a gripping fixture having a grip surface, the grip surface configured to hold an end of a contiguous, preformed material;
   a feed system having a feed outlet positioned above the grip surface, the feed system configured to feed the contiguous, preformed material into a build zone between the feed outlet and the grip surface; and
   a laser delivery system arranged to direct at least one laser beam into the build zone to form a hot spot in the build zone; and
   a positioning system arranged to effect relative motion between the grip surface and the feed outlet.

10. The apparatus of claim 9, wherein the positioning system is arranged to affect the relative motion in three orthogonal directions, and wherein the gripping fixture is coupled to the positioning system.

11. The apparatus of claim 10, wherein the positioning system is further arranged to effect motion of the grip surface above the build zone.

12. The apparatus of claim 11, wherein the positioning system is further arranged to affect the relative motion in at least one of a rotational direction and a tilt direction.

13. The apparatus of claim 9, wherein the feed system is further configured to feed the contiguous, preformed material at a variable speed into the build zone.

14. The apparatus of claim 9, wherein the feed system further comprises a feed source that is rotatable about a feed axis of the contiguous, preformed material.

15. The apparatus of claim 9, further comprising:
   a furnace enclosing the build zone and the feed outlet; and
   a cooling element positioned outside of the furnace, the cooling element configured to cool the contiguous, preformed material above the feed outlet.

16. The apparatus of claim 9, wherein the contiguous, preformed material comprises at least one of a glass, a glass-ceramic and a ceramic.

17. The apparatus of claim 16, wherein the contiguous, preformed material is in the form of a rod, a fiber, a tube, a sheet, a plate or a ribbon.

18. The apparatus of claim 9, further comprising:
   a controller coupled to the feed system, the laser delivery system and the positioning system,
   wherein the controller is configured to control the relative motion between the grip surface and the feed outlet based at least in part on controller communication with the feed system, the laser delivery system and the positioning system.

19. An apparatus for making a three-dimensional object, comprising:
- a pedestal having a build surface;
- a feed system having a feed outlet positioned above the build surface, the feed system configured to feed a contiguous, preformed material into a build zone between the feed outlet and the build surface;
- a furnace enclosing the build surface, build zone and the feed outlet;
- a laser delivery system arranged to direct at least one laser beam into the build zone to form a hot spot in the build zone; and
- a positioning system arranged to effect relative motion between the build surface and the feed outlet,
- wherein the feed system further comprises a feed source that is rotatable about a feed axis of the contiguous, preformed material.

20. The apparatus of claim 19, wherein the positioning system is arranged to affect the relative motion in three orthogonal directions, and wherein the pedestal is coupled to the positioning system.

21. The apparatus of claim 20, wherein the positioning system is further arranged to affect the relative motion in at least one of a rotational direction and a tilt direction.

22. The apparatus of claim 19, wherein the feed system is further configured to feed the contiguous, preformed material at a variable speed into the build zone.

23. The apparatus of claim 19, further comprising:
- a cooling element positioned outside of the furnace, the cooling element configured to cool the contiguous, preformed material above the feed outlet.

24. The apparatus of claim 19, wherein the contiguous, preformed material comprises at least one of a glass, a glass-ceramic and a ceramic.

25. The apparatus of claim 24, wherein the contiguous, preformed material is in the form of a rod, a fiber, a tube, a sheet, a plate or a ribbon.

26. The apparatus of claim 19, further comprising:
- a controller coupled to the feed system, the laser delivery system and the positioning system,
- wherein the controller is configured to control the relative motion between the build surface and the feed outlet based at least in part on controller communication with the feed system, the laser delivery system and the positioning system.

27. An apparatus for making a three-dimensional object, comprising:
- a pedestal having a build surface;
- a feed system having a feed outlet positioned above the build surface, the feed system configured to feed a contiguous, preformed material into a build zone between the feed outlet and the build surface;
- a furnace enclosing the build surface, build zone and the feed outlet;
- a laser delivery system arranged to direct at least one laser beam into the build zone to form a hot spot in the build zone;
- a positioning system arranged to effect relative motion between the build surface and the feed outlet; and
- a cooling element positioned outside of the furnace, the cooling element configured to cool the contiguous, preformed material above the feed outlet.

28. The apparatus of claim 27, wherein the positioning system is arranged to affect the relative motion in three orthogonal directions, and wherein the pedestal is coupled to the positioning system.

29. The apparatus of claim 28, wherein the positioning system is further arranged to affect the relative motion in at least one of a rotational direction and a tilt direction.

30. The apparatus of claim 27, wherein the feed system is further configured to feed the contiguous, preformed material at a variable speed into the build zone.

31. The apparatus of claim 27, wherein the feed system further comprises a feed source that is rotatable about a feed axis of the contiguous, preformed material.

32. The apparatus of claim 27, wherein the contiguous, preformed material comprises at least one of a glass, a glass-ceramic and a ceramic.

33. The apparatus of claim 32, wherein the contiguous, preformed material is in the form of a rod, a fiber, a tube, a sheet, a plate or a ribbon.

34. The apparatus of claim 27, further comprising:
- a controller coupled to the feed system, the laser delivery system and the positioning system,
- wherein the controller is configured to control the relative motion between the build surface and the feed outlet based at least in part on controller communication with the feed system, the laser delivery system and the positioning system.

35. An apparatus for making a three-dimensional object, comprising:
- a pedestal having a build surface;
- a feed system having a feed outlet positioned above the build surface, the feed system configured to feed a contiguous, preformed material into a build zone between the feed outlet and the build surface;
- a furnace enclosing the build surface, build zone and the feed outlet;
- a laser delivery system arranged to direct at least one laser beam into the build zone to form a hot spot in the build zone;
- a positioning system arranged to effect relative motion between the build surface and the feed outlet; and
- a controller coupled to the feed system, the laser delivery system and the positioning system,
- wherein the controller is configured to control the relative motion between the build surface and the feed outlet based at least in part on controller communication with the feed system, the laser delivery system and the positioning system.

36. The apparatus of claim 35, wherein the positioning system is arranged to affect the relative motion in three orthogonal directions, and wherein the pedestal is coupled to the positioning system.

37. The apparatus of claim 36, wherein the positioning system is further arranged to affect the relative motion in at least one of a rotational direction and a tilt direction.

38. The apparatus of claim 35, wherein the feed system is further configured to feed the contiguous, preformed material at a variable speed into the build zone.

39. The apparatus of claim 35, wherein the feed system further comprises a feed source that is rotatable about a feed axis of the contiguous, preformed material.

40. The apparatus of claim 35, further comprising:
- a cooling element positioned outside of the furnace, the cooling element configured to cool the contiguous, preformed material above the feed outlet.

* * * * *